United States Patent
Su et al.

(10) Patent No.: US 10,601,514 B2
(45) Date of Patent: Mar. 24, 2020

(54) SIGNAL SENDING AND RECEIVING METHOD, APPARATUS, AND SYSTEM

(71) Applicant: Huawei Technologies Co., Ltd., Shenzhen (CN)

(72) Inventors: Wei Su, Chengdu (CN); Maarten Petrus Joseph Vissers, Amsterdam (NL); Qiuyou Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/934,623

(22) Filed: Mar. 23, 2018

(65) Prior Publication Data

US 2018/0212683 A1 Jul. 26, 2018

Related U.S. Application Data

(63) Continuation of application No. PCT/CN2016/093576, filed on Aug. 5, 2016.

(30) Foreign Application Priority Data

Sep. 25, 2015 (CN) .......................... 2015 1 0624117

(51) Int. Cl.
*H04B 10/516* (2013.01)
*H04B 10/60* (2013.01)
(Continued)

(52) U.S. Cl.
CPC ........... *H04B 10/516* (2013.01); *H04B 10/60* (2013.01); *H04J 3/1658* (2013.01); *H04L 47/34* (2013.01); *H04L 12/2885* (2013.01)

(58) Field of Classification Search
None
See application file for complete search history.

(56) References Cited

U.S. PATENT DOCUMENTS

2005/0271022 A1* 12/2005 Osawa ................. H04B 10/114
 370/338
2006/0203847 A1* 9/2006 Toyoda .................. H04J 14/02
 370/468

(Continued)

FOREIGN PATENT DOCUMENTS

CN 1790993 A 6/2006
CN 101155016 A 4/2008
(Continued)

*Primary Examiner* — Casey L Kretzer
(74) *Attorney, Agent, or Firm* — Slater Matsil, LLP

(57) ABSTRACT

An embodiment method includes: mapping a to-be-transmitted optical channel unit signal of n times a benchmark rate to X first optical channel physical link signals; adding a link sequence indicator overhead to each of the X first optical channel physical link signals, to generate X second optical channel physical link signals; and modulating and sending the X second optical channel physical link signals by using X preset optical modules in a one-to-one manner. A rate of the first optical channel physical link signal is $m_i$ times the benchmark rate, $n \geq 2$, $X \geq 2$, $m_i \geq 1$, and $$\sum_{i=1}^{X} m_i = n.$$

15 Claims, 14 Drawing Sheets

(51) Int. Cl.
*H04J 3/16* (2006.01)
*H04L 12/801* (2013.01)
*H04L 12/28* (2006.01)

(56) References Cited

U.S. PATENT DOCUMENTS

| | | |
|---|---|---|
| 2007/0248121 A1 | 10/2007 | Zou |
| 2009/0103497 A1 | 4/2009 | Fernandez-Corbaton et al. |
| 2010/0049884 A1* | 2/2010 | Sharma .............. H04L 1/1685 710/30 |
| 2010/0221005 A1 | 9/2010 | Zhao |
| 2013/0259478 A1 | 10/2013 | Komaki |
| 2014/0237323 A1 | 8/2014 | Yu et al. |
| 2014/0334503 A1 | 11/2014 | Dong et al. |
| 2015/0098703 A1 | 4/2015 | Wu et al. |
| 2015/0139650 A1 | 5/2015 | Su et al. |
| 2015/0236810 A1 | 8/2015 | Fu et al. |
| 2015/0256258 A1 | 9/2015 | Fu et al. |
| 2015/0365164 A1* | 12/2015 | Tsurumi ........... H04B 10/07955 398/23 |
| 2017/0041067 A1* | 2/2017 | Goto ................... H04B 10/075 |
| 2017/0093498 A1 | 3/2017 | Su et al. |

FOREIGN PATENT DOCUMENTS

| | | |
|---|---|---|
| CN | 101547057 A | 9/2009 |
| CN | 101826920 A | 9/2010 |
| CN | 101841749 A | 9/2010 |
| CN | 102820951 A | 12/2012 |
| CN | 102893629 A | 1/2013 |
| CN | 103190107 A | 7/2013 |
| CN | 103595515 A | 2/2014 |
| CN | 103716108 A | 4/2014 |
| CN | 103780327 A | 5/2014 |
| EP | 2560301 A1 | 2/2013 |
| EP | 2874332 | 5/2015 |
| EP | 2884687 A1 | 6/2015 |
| EP | 2958251 | 12/2015 |
| EP | 2958261 | 12/2015 |
| RU | 2421925 C1 | 6/2011 |
| RU | 2454798 C2 | 6/2012 |
| WO | 2013185327 A1 | 12/2013 |
| WO | 2014019359 A1 | 2/2014 |
| WO | 2014124595 A1 | 8/2014 |

* cited by examiner

FIG. 5

SIGNAL SENDING AND RECEIVING METHOD, APPARATUS, AND SYSTEM

CROSS-REFERENCE TO RELATED APPLICATIONS

This application is a continuation of International Application No. PCT/CN2016/093576, filed on Aug. 5, 2016, which claims priority to Chinese Patent Application No. 201510624117.1, filed on Sep. 25, 2015. The disclosures of the aforementioned applications are hereby incorporated by reference in their entireties.

TECHNICAL FIELD

The present disclosure relates to the field of optical communications technologies, and in particular, to a signal sending and receiving method, an apparatus, and a system.

BACKGROUND

An Optical Transport Network (OTN) is a core technology of a transport network. The OTN has robust operation administration and maintenance (OAM) capabilities, a strong Tandem Connection Monitoring (TCM) capability, an out-of-band Forward Error Correction (FEC) capability, and can implement flexible scheduling and management of large-capacity services.

The OTN standardization system defines four Optical Channel Transport Units (OTUs) with fixed line rates. For example, the OTN standardization system defines an OTU1, an OTU2, an OTU3, and an OTU4, whose line rate levels are respectively 2.5 gigabits per second (Gbit/s), 10 Gbit/s, 40 Gbit/s, and 100 Gbit/s. The four OTUs respectively correspond to four Optical Channel Data Units (ODUs) of same rate levels: an ODU1, an ODU2, an ODU3, and an ODU4. The four ODUs respectively correspond to four Optical Channel Payload Units (OPUs) of same rate levels: an OPU1, an OPU2, an OPU3, and an OPU4.

With development of applications such as the Internet and cloud computing, information traffic in a network increases exponentially. Thus, it is desirable that the OTN provide more available bandwidth, and the OTN being developed to higher transfer rates, for example, 400 Gbit/s or 1 TGbit/s.

Currently, the International Telecommunication Union-Telecommunication Standardization Sector (ITU-T) is formulating an OTUCn (where C is a roman numeral for 100, and n is a positive integer) interface for beyond-100 G OTN applications. The OTUCn interface can provide an electrical interface processing capability of an n*100 G rate. An OTUCn frame consists of n OTU subframes. The OTUCn frame is managed and monitored as one signal, and provides a network management function at an optical channel transport unit level. Correspondingly, there are an ODUCn and an OPUCn of a rate of n*100 G. An ODUCn overhead is added to an OPUCn frame to form an ODUCn frame, and a Frame Alignment (FA) overhead and an OTUCn overhead are added to the ODUCn frame to form an OTUCn frame. After the OTUCn frame is modulated by an optical module matching a rate corresponding to the OTUCn frame, a serial OTUCn bit data flow is formed, and the serial OTUCn bit data flow is sent by using one way of optical fiber.

In the current system, the ODUCn is mapped to an OTUCn having a same rate as the ODUCn, and the OTUCn is sent only after being modulated by an optical module at a same rate as the OTUCn. Therefore, to send ODUCns of different rates, optical modules of different rates are used to perform modulation. Further, in the current system, to send optical channel unit signals of different rates, optical modules of different rates are used to perform modulation. This results in high network costs.

SUMMARY

Embodiments of the present disclosure provide a signal sending and receiving method, an apparatus, and a system, so as to resolve a problem of high network costs due to using different optical modules of different rates to perform modulation when optical channel unit signals of different rates are sent.

To achieve the foregoing objective, the following technical solutions are used in the embodiments of the present disclosure.

According to a first aspect, an embodiment of the present disclosure provides a signal sending method. The method includes mapping a to-be-transmitted optical channel unit signal of n times a benchmark rate to X first optical channel physical link signals. A rate of the first optical channel physical link signal is $m_i$ times the benchmark rate, $n \geq 2$, $X \geq 2$, $m_i \geq 1$, and $$\sum_{i=1}^{X} m_i = n.$$

The method further includes adding a link sequence indicator overhead to each of the X first optical channel physical link signals to generate X second optical channel physical link signals. The link sequence indicator overhead of each first optical channel physical link signal is used to indicate an order of the first optical channel physical link signal, and a rate of the second optical channel physical link signal is $m_i$ times the benchmark rate. The method further includes modulating and sending the X second optical channel physical link signals by using X preset optical modules in a one-to-one correspondence manner.

In a first possible implementation manner of the first aspect, the mapping a to-be-transmitted optical channel unit signal of n times a benchmark rate to X first optical channel physical link signals includes: dividing the to-be-transmitted optical channel unit signal of n times the benchmark rate into X preset groups; and mapping X groups of optical channel unit subframe signals to the X first optical channel physical link signals in a one-to-one correspondence manner and in a preset mapping manner, where the preset mapping manner is bit synchronous mapping or asynchronous mapping.

With reference to the first aspect or the first possible implementation manner of the first aspect, in a second possible implementation manner of the first aspect, before the modulating and sending the X second optical channel physical link signals by using X preset optical modules in a one-to-one correspondence manner, the signal sending method further includes: performing forward error correction FEC encoding processing on the X second optical channel physical link signals.

With reference to any one of the first aspect or the first possible implementation manner of the first aspect or the second possible implementation manner of the first aspect, in a third possible implementation manner of the first aspect, each of the X first optical channel physical link signals has a different $m_i$; or any j of the X first optical channel physical link signals have a same $m_i$, where $2 \leq j \leq X$.

With reference to any one of the first aspect or the first possible implementation manner of the first aspect to the third possible implementation manner of the first aspect, in a fourth possible implementation manner of the first aspect, if the optical channel unit signal of n times the benchmark rate is an optical channel data unit ODUKn signal of n times the benchmark rate, the first optical channel physical link signal is a first optical channel transport unit OTUKm$_i$ signal.

According to a second aspect, an embodiment of the present disclosure provides a signal receiving method. The method includes receiving X second optical channel physical link signals by using X optical modules, where a rate of the second optical channel physical link signal is m$_i$ times a benchmark rate, m$_i$≥1, and X≥2. The method further includes separately extracting a link sequence indicator overhead of each of the X second optical channel physical link signals to obtain X first optical channel physical link signals. The link sequence indicator overhead of each second optical channel physical link signal is used to indicate an order of a first optical channel physical link signal that corresponds to the second optical channel physical link signal, and a rate of the first optical channel physical link signal is m$_i$ times the benchmark rate. The method further includes demapping the X first optical channel physical link signals, to obtain an optical channel unit signal of n times the benchmark rate, where n≥2, and $$\sum_{i=1}^{X} m_i = n.$$

In a first possible implementation manner of the second aspect, the demapping the X first optical channel physical link signals, to obtain an optical channel unit signal of n times the benchmark rate includes: demapping the X first optical channel physical link signals in a preset demapping manner, to obtain X groups of optical channel unit signals, where the preset demapping manner is bit synchronous demapping or asynchronous demapping, and a rate of each group of optical channel unit signals is mi times the benchmark rate; and combining the X groups of optical channel unit signals, to generate the optical channel unit signal of n times the benchmark rate.

With reference to the second aspect or the first possible implementation manner of the second aspect, in a second possible implementation manner of the second aspect, before the separately extracting a link sequence indicator overhead of each of the X second optical channel physical link signals, to obtain X first optical channel physical link signals, the method further includes: performing forward error correction FEC decoding on the X second optical channel physical link signals.

With reference to any one of the second aspect or the first possible implementation manner of the second aspect or the second possible implementation manner of the second aspect, in a third possible implementation manner of the second aspect, each of the X second optical channel physical link signals has a different m$_i$; or any j of the X second optical channel physical link signals have a same m$_i$, where 2≤j≤X.

With reference to any one of the second aspect or the first possible implementation manner of the second aspect to the third possible implementation manner of the second aspect, in a fourth possible implementation manner of the second aspect, if the second optical channel physical link signal is a second optical channel transport unit OTUKm$_i$ signal, the optical channel unit signal of n times the benchmark rate is an optical channel data unit ODUKn signal of n times the benchmark rate.

According to a third aspect, an embodiment of the present disclosure provides a transmitter. The transmitter includes a mapping unit, configured to map a to-be-transmitted optical channel unit signal of n times a benchmark rate to X first optical channel physical link signals. A rate of the first optical channel physical link signal is m$_i$ times the benchmark rate, n≥2, X≥2, m$_i$≥1, and $$\sum_{i=1}^{X} m_i = n.$$

The transmitter further includes an overhead addition unit, configured to add a link sequence indicator overhead to each of the X first optical channel physical link signals obtained through mapping by the mapping unit, to generate X second optical channel physical link signals. The link sequence indicator overhead of each first optical channel physical link signal is used to indicate an order of the first optical channel physical link signal, and a rate of the second optical channel physical link signal is m$_i$ times the benchmark rate. The transmitter further includes a modulation unit, configured to modulate, by using X preset optical modules in a one-to-one correspondence manner. The X second optical channel physical link signals generated by the overhead addition unit. The transmitter further includes a sending unit, configured to send the X second optical channel physical link signals modulated by the modulation unit.

In a first possible implementation manner of the third aspect, the transmitter further includes a grouping unit. The grouping unit is configured to divide the to-be-transmitted optical channel unit signal of n times the benchmark rate into X preset groups. The mapping unit is configured to map the X groups of optical channel unit signals obtained through division by the grouping unit to the X first optical channel physical link signals in a one-to-one correspondence manner and in a preset mapping manner. The preset mapping manner is bit synchronous mapping or asynchronous mapping.

With reference to the third aspect or the first possible implementation manner of the third aspect, in a second possible implementation manner of the third aspect, the transmitter further includes an encoding unit. The encoding unit is configured to: before the modulation unit modulates the X second optical channel physical link signals by using the X preset optical modules in the one-to-one correspondence manner, perform forward error correction FEC encoding processing on the X second optical channel physical link signals generated by the overhead addition unit.

With reference to any one of the third aspect or the first possible implementation manner of the third aspect or the second possible implementation manner of the third aspect, in a third possible implementation manner of the third aspect, each of the X first optical channel physical link signals of m$_i$ times the benchmark rate has a different m$_i$ or any j of the X first optical channel physical link signals of m$_i$ times the benchmark rate have a same m$_i$, where 2≤j≤X.

With reference to any one of the third aspect or the first possible implementation manner of the third aspect to the third possible implementation manner of the third aspect, in a fourth possible implementation manner of the third aspect, if the optical channel unit signal of n times the benchmark rate is an optical channel data unit ODUKn signal of n times the benchmark rate, the first optical channel physical link signal is a first optical channel transport unit OTUKm$_i$ signal.

In a fourth aspect, an embodiment of the present disclosure provides a receiver. The receiver includes a receiving unit, configured to receive X second optical channel physical link signals by using X optical modules. A rate of the second optical channel physical link signal is m$_i$ times a benchmark rate, m$_i$≥1, and X≥2. The receiver further includes an extraction unit, configured to separately extract a link sequence indicator overhead of each of the X second optical channel physical link signals received by the receiving unit, to obtain X first optical channel physical link signals. The link sequence indicator overhead of each second optical channel physical link signal is used to indicate an order of a first optical channel physical link signal that corresponds to the second optical channel physical link signal, and a rate of the first optical channel physical link signal is m$_i$ times the benchmark rate. The receiver further includes a demapping unit, configured to demap the X first optical channel physical link signals obtained by the extraction unit, to obtain an optical channel unit signal of n times the benchmark rate, where n÷2, and $$\sum_{i=1}^{X} m_i = n.$$

In a first possible implementation manner of the fourth aspect, the demapping unit is configured to demap the X first optical channel physical link signals in a preset demapping manner, to obtain X groups of optical channel unit signals. The preset demapping manner is bit synchronous demapping or asynchronous demapping, and a rate of each group of optical channel unit signals is mi times the benchmark rate. The receiver further includes a combination unit, where the combination unit is configured to combine the X groups of optical channel unit subframe signals obtained by the demapping unit, to generate the optical channel unit signal of n times the benchmark rate.

With reference to the fourth aspect or the first possible implementation manner of the fourth aspect, in a second possible implementation manner of the fourth aspect, the receiver further includes a decoding unit. The decoding unit is configured to: before the extraction unit separately extracts the link sequence indicator overhead of each of the X second optical channel physical link signals, to obtain the X first optical channel physical link signals, perform forward error correction FEC decoding on the X second optical channel physical link signals received by the receiving unit.

With reference to any one of the fourth aspect or the first possible implementation manner of the fourth aspect or the second possible implementation manner of the fourth aspect, in a third possible implementation manner of the fourth aspect, each of the X second optical channel physical link signals has a different m$_i$ or any j of the X second optical channel physical link signals have a same m$_j$, where 2≤j≤X.

With reference to any one of the fourth aspect or the first possible implementation manner of the fourth aspect to the third possible implementation manner of the fourth aspect, in a fourth possible implementation manner of the fourth aspect, if the second optical channel physical link signal is a second optical channel transport unit OTUKmi signal, the optical channel unit signal of n times the benchmark rate is an optical channel data unit ODUKn signal of n times the benchmark rate.

According to a fifth aspect, an embodiment of the present disclosure provides a signal transmission system, including the transmitter described above and the receiver described above.

The embodiments of the present disclosure provide signal sending and receiving methods, an apparatus, and a system. After a to-be-transmitted optical channel unit signal of n times a benchmark rate is mapped to X first optical channel physical link signals of mi times the benchmark rate, a link sequence indicator overhead is added to each first optical channel physical link signal of mi times the benchmark rate of the X first optical channel physical link signals of mi times the benchmark rate, to generate X second optical channel physical link signals of mi times the benchmark rate, where n≥2, X≥2, m$_i$≥1, m$_1$+m$_2$+ . . . +m$_i$+ . . . +m$_X$=n, and the link sequence indicator overhead of each first optical channel physical link signal is used to indicate an order of the first optical channel physical link signal, and then the X second optical channel physical link signals of m$_i$ times the benchmark rate are modulated and sent by using X preset optical modules in a one-to-one correspondence manner.

By means of the solutions, an optical channel unit signal of n times a benchmark rate is no longer mapped to a first optical channel physical link signal of a same rate as the optical channel unit signal, but is mapped to X first optical channel physical link signals of m$_i$ times the benchmark rate. The rate of the first optical channel physical link signal is m$_i$ times the benchmark rate, and m$_1$+m$_2$+ . . . +m$_i$+ . . . +m$_X$=n. Therefore, the rate of the first optical channel physical link signal is less than the rate of the optical channel unit signal. That is, in the present disclosure, the optical channel unit signal is decomposed into X low-rate signals. Subsequently, the X low-rate signals are modulated and sent by using X preset optical modules. By means of the present disclosure, X existing low-rate optical modules can be used to modulate X signals, and an optical module that matches a rate corresponding to an optical channel unit signal is no longer used for modulation, thereby reducing network costs when optical channel units of different rates need to use optical modules of different rates to perform modulation.

BRIEF DESCRIPTION OF THE DRAWINGS

To describe the technical solutions in the embodiments of the present disclosure or in the prior art more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

FIG. 5 is a schematic diagram of a frame structure of an OTUCn signal after overhead information is added according to an embodiment of the present disclosure;

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure.

In the specification, claims, and accompanying drawings of the present disclosure, the terms "first", "second", "third", "fourth", and so on are intended to distinguish between different objects but not to indicate a particular order. In addition, the terms "comprising", "including", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

In the following description, specific details such as a particular system structure, an interface, and a technology are set forth in an illustrative but not a restrictive sense to make a thorough understanding of the present disclosure. However, a person skilled in the art should know that the present disclosure may be practiced in other embodiments without these specific details. In other cases, detailed descriptions of well-known apparatuses, circuits, and methods are omitted, so that the present disclosure is described without being obscured by unnecessary details.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Figure 1:
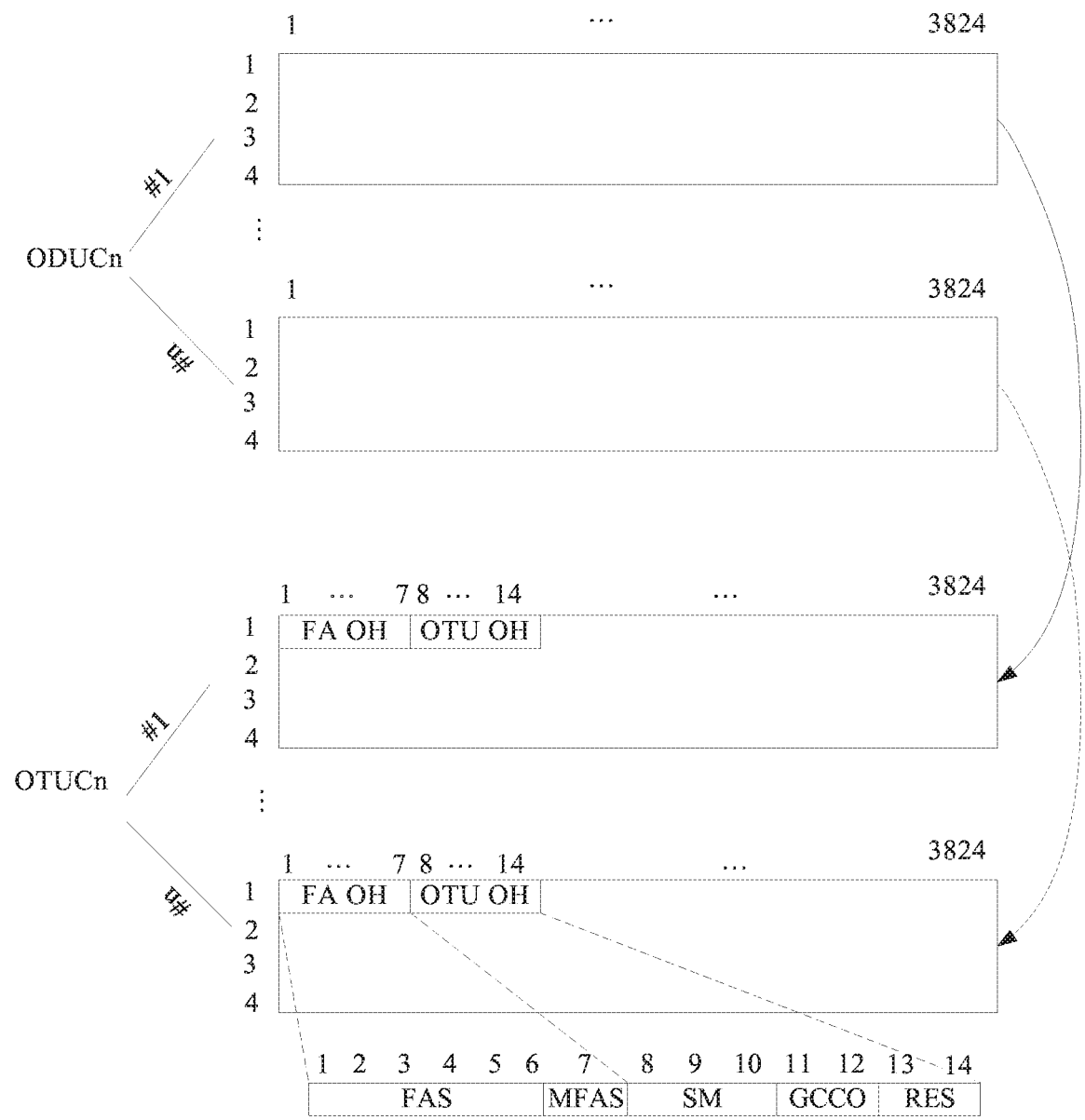
FIG. 1 is a schematic structural diagram of an OTUCn frame in a current system.

The ITU-T Standardization Sector is formulating an OTUCn interface for beyond-100 G OTN applications. The OTUCn interface can provide an electrical interface processing capability of a rate of n*100 G. As shown in FIG. 1, an OTUCn frame includes n OTU subframes (in FIG. 1, #n is used to indicate the $n^{th}$ OTU subframe), each OTU subframe has four rows and 3824 columns, an FA OH is a frame alignment overhead byte, used to provide a frame synchronization alignment function, and an OTU OH is an OTUCn overhead byte.

The FA OH is divided into two parts: a frame alignment signal (FAS) and a Multiframe Alignment Signal (MFAS). The FA OH includes seven bytes in total from the first row and the first column to the first row and the seventh column. The FAS is located in the first row and the first column to the first row and the sixth column. The MFAS is located in the first row and the seventh column.

The OTU OH includes seven bytes in total from the first row and the eighth column to the first row and the fourteenth column. The OTU OH includes three parts: Multiframe Alignment Signal (SM), General Communications Channel (GCC), and Reserved for Future International Standardization (RES). The RES is a reserved position, and is currently stipulated to be all 0s. The SM is section overhead monitoring. SM overhead information includes at least a Trail Trace Identifier (TTI), a Bit Interleaved Parity 8 (BIP-8), a Backward Defect Indication (BDI), and a Backward Error Indication and Backward Incoming Alignment Error (BEI/BIAE).

The OTUCn frame is used managed and monitored as one signal, provides a network management function at an optical channel transport unit level, and mainly carries an OTUCn overhead at a position of an OTU OH of the first OTU subframe. Correspondingly, there is an ODUCn of a rate of n*100 G, a frame structure of the ODUCn may be considered to include n ODU subframes (in FIG. 1, #n is used to indicate the $n^{th}$ ODU subframe), and each ODU subframe has four rows and 3824 columns. A frame alignment overhead FA and an OTUCn overhead are added to an ODUCn frame to form an OTUCn frame. After the OTUCn frame is modulated by an optical module matching a rate corresponding to the OTUCn frame, a serial OTUCn bit data flow is formed, and the serial OTUCn bit data flow is sent by using one way of optical fiber.

Although the OTUCn interface provides an electrical interface capability of a multi-rate level of n*100 G, actually, because of diversity of the rate of the electrical interface, various types of optical modules matching the rate corresponding to the electrical interface are required. This greatly increases network costs. In actual networking, it is impossible to have so many optical modules of different rate types that can be used.

Specifically, in the current system, the ODUCn is mapped to an OTUCn of a same rate, and the OTUCn is first modulated by an optical module matching a rate corresponding to the OTUCn, and then can be sent. Therefore, to send ODUCns of different rates, optical modules of different rates are used. For example, a transmitter encapsulates, by means of bit synchronization, an ODUC4 of 400 G in an OTUC4, and adds an OTUC4 overhead to form an optical transport unit OTUC4. Subsequently, the transmitter modulates, by using an optical module of 400 G, the OTUC4 onto a single-carrier or multiple-carrier signal, and sends the OTUC4 by using a same optical fiber.

For the problem in the current system of high-cost transmission of optical channel data units ODUCns of different rates, the embodiments of the present disclosure provide signal sending and receiving methods, an apparatus, and a system. Multiple low-rate optical modules are used to implement transmission of an OTN signal of a higher rate.

Figure 2:
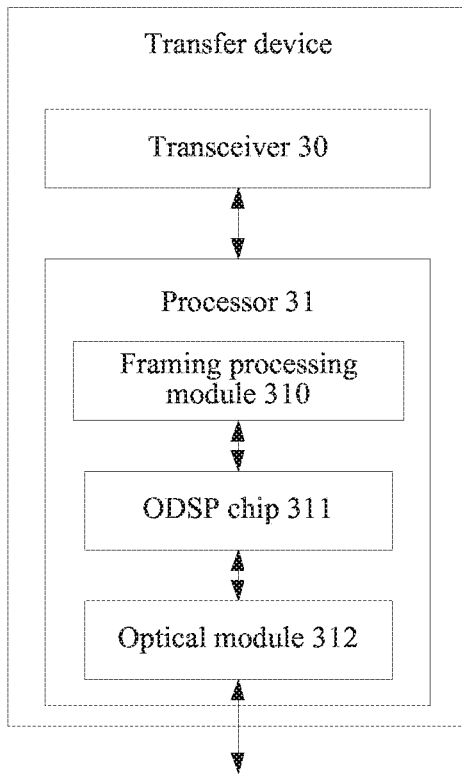
FIG. 2 is a first schematic structural diagram of a transfer device according to an embodiment of the present disclosure.

FIG. 2 shows a transfer device according to an embodiment of the present disclosure. As shown in FIG. 2, the transfer device includes [[a]] one or more transceivers 30 and a processor 31. The processor 31 may be a single-core or multi-core central processing unit, or an application-specific integrated circuit, or one or more integrated circuits configured to implement this embodiment of the present disclosure. The processor 31 includes a framing processing module 310, an ODSP (Optical Digital Signal Processor, optical digital signal processor) chip 311, and an optical module 312. Specifically, the ODSP chip 311 may be an independent function module, or may be integrated into the optical module 312. Specifically, the framing processing module 310 may be a chip for implementing data framing. The framing processing module 310 may map to and encapsulate in X first optical channel physical link signals a to-be-transmitted optical channel unit signal of n times a benchmark rate, and adds a link sequence indicator overhead, to form X second optical channel physical link signals. The framing processing module 310 may further demap the received X second optical channel physical link signals to obtain the optical channel unit signal of n times the benchmark rate. The ODSP chip 311 is configured to complete modulation and demodulation processing of a signal, and is configured to enhance a link error code tolerance capability, or perform other related processing. The optical module 312 is configured to complete optical-to-electrical conversion. Specifically, before the X second optical channel physical link signals are sent, the optical module 312 may convert an electrical signal into an optical signal, and may convert the optical signal into an electrical signal after receiving the X second optical channel physical link signals.

Embodiment 1

Figure 3:
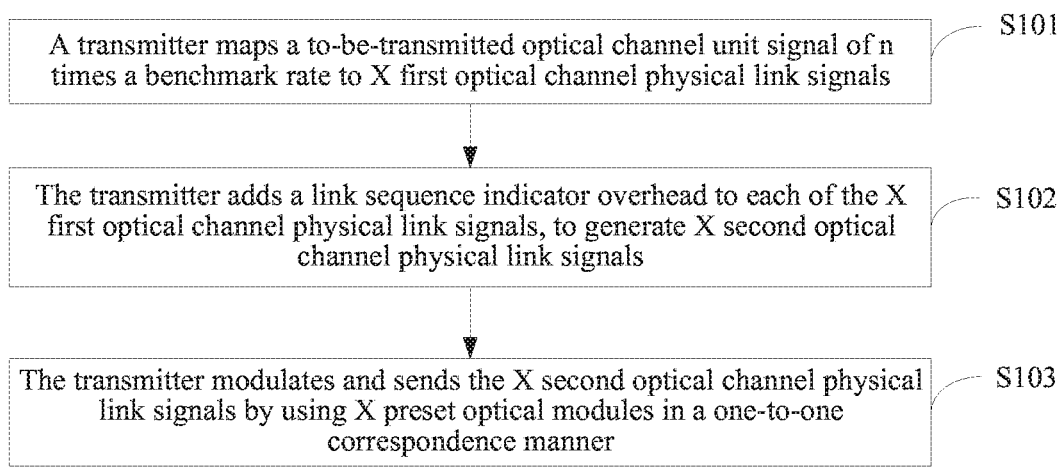
FIG. 3 is a schematic flowchart of a signal sending method according to an embodiment of the present disclosure.

This embodiment of the present disclosure provides a signal sending method. As shown in FIG. 3, the method includes the following steps.

In step S101, the transmitter maps a to-be-transmitted optical channel unit signal of n times a benchmark rate to X first optical channel physical link signals.

A rate of the first optical channel physical link signal is $m_i$ times the benchmark rate, $n \geq 2$, $X \geq 2$, $m_i \geq 1$, and $$\sum_{i=1}^{X} m_i = n.$$

In step S102, the transmitter adds a link sequence indicator overhead to each of the X first optical channel physical link signals, to generate X second optical channel physical link signals.

The link sequence indicator overhead of each first optical channel physical link signal is used to indicate an order of the first optical channel physical link signal, and a rate of the second optical channel physical link signal is $m_i$ times the benchmark rate.

In step S103, the transmitter modulates and sends the X second optical channel physical link signals by using X preset optical modules in a one-to-one correspondence manner.

It should be noted that the benchmark rate in this embodiment of the present disclosure may be 100 G, or may be 40 G. This is not specifically limited in this embodiment of the present disclosure.

Optionally, if the optical channel unit signal of n times the benchmark rate is an optical channel data unit ODUKn signal of n times the benchmark rate, the first optical channel physical link signal of mi times the benchmark rate is a first optical channel transport unit OTUKmi signal of mi times the benchmark rate. K is a level of an ODU or a level of an OTU, K is a positive integer, and a value of K is not specifically limited in this embodiment of the present disclosure.

For example, if the benchmark rate is 100 G, the ODUKn signal is an optical channel data unit ODUCn signal of a rate of n*100 G, and the OTUKmi signal is an optical channel transport unit OTUCmi signal of a rate of mi*100 G, where C is a roman numeral for 100, and n and mi are both positive integers.

Optionally, if the optical channel unit signal of n times the benchmark rate is an optical channel payload unit OPUKn signal of n times the benchmark rate, the first optical channel physical link signal of mi times the benchmark rate is a first optical channel transport unit OTUKmi signal of mi times the benchmark rate. Similarly, K is a level of an OPU or a level of an OTU, K is a positive integer, and a value of K is not specifically limited in this embodiment of the present disclosure.

For example, if the benchmark rate is 100 G, the OPUKn signal is an optical channel payload unit OPUCn signal of a rate of n*100 G, and the OTUKmi signal is an optical channel transport unit OTUCmi signal of a rate of mi*100 G, where C is a roman numeral for 100, and n and mi are both positive integers.

Optionally, if the optical channel unit signal of n times the benchmark rate is an optical channel transport unit OTUKn signal of n times the benchmark rate, the first optical channel physical link signal of mi times the benchmark rate is an FEC frame whose payload area is an OTUKmi of mi times the benchmark rate. Similarly, K is a level of an OTU, K is a positive integer, and a value of K is not specifically limited in this embodiment of the present disclosure.

For example, if the benchmark rate is 100 G, the OTUKmi signal is an optical channel transport unit OTUCmi signal of a rate of mi*100 G, and the OTUKn signal is an OTUCn signal of a rate of n*100 G, where C is a roman numeral for 100, and n and mi are both positive integers.

By performing step S101, a transmitter maps a to-be-transmitted optical channel unit signal of n times a benchmark rate to X first optical channel physical link signals.

Figure 4:
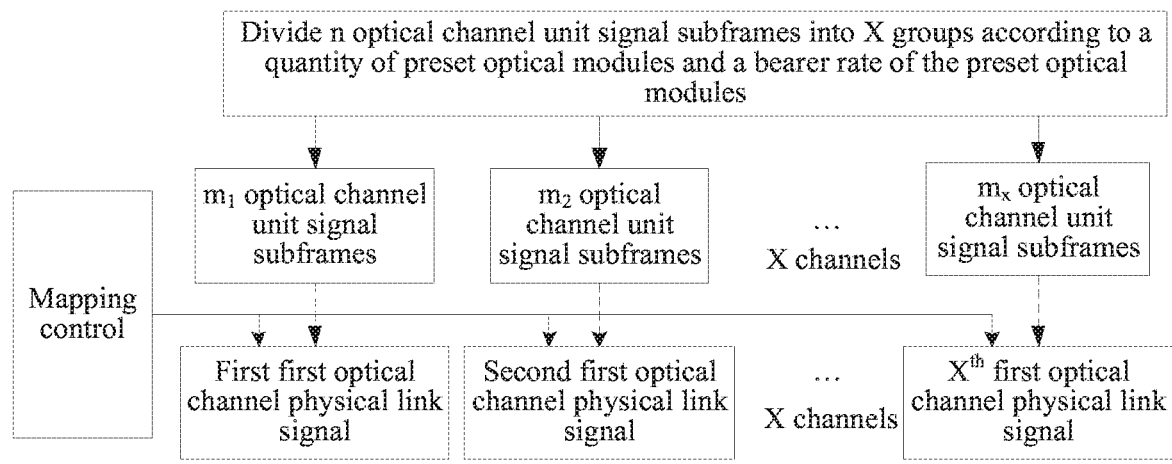
FIG. 4 is a first schematic diagram of a signal mapping procedure according to an embodiment of the present disclosure.

Optionally, as shown in FIG. 4, the method for mapping, by the transmitter, the to-be-transmitted optical channel unit signal to the X first optical channel physical link signals is: dividing, by the transmitter, the to-be-transmitted optical channel unit signal of n times the benchmark rate into X preset groups; and mapping, by the transmitter, the X groups of optical channel unit signals to the X first optical channel physical link signals in a preset mapping manner.

The method for dividing, by the transmitter, the to-be-transmitted optical channel unit signal of n times the benchmark rate into X preset groups may include dividing, by the transmitter, n optical channel unit subframes in a frame structure of the to-be-transmitted optical channel unit signal of n times the benchmark rate into X preset groups.

Specifically, the transmitter divides the n optical channel unit subframes into X groups according to a quantity of the preset optical modules and a bearer rate of the preset optical modules.

The preset mapping manner in this embodiment of the present disclosure is bit synchronous mapping or asynchronous mapping.

Specifically, if the first optical channel physical link signal includes mi first optical channel physical link subframes, the transmitter maps, in the preset mapping manner, mi optical channel unit subframes in a frame structure of the pth group of optical channel unit subframe signals to mi first optical channel physical link subframes in a frame structure of the pth first optical channel physical link signal, where $X \geq p \geq 1$.

Specially, if $m_i=1$, the frame structure of the pth group of optical channel unit subframe signals includes only one optical channel unit subframe, and the frame structure of the pth first optical channel physical link signal includes only one first optical channel physical link subframe. The transmitter directly maps the one optical channel unit subframe to the first optical channel physical link subframe in the frame structure of the first optical channel physical link signal.

The preset mapping manner in this embodiment of the present disclosure may be bit synchronous mapping. For example, the bit synchronous mapping manner in this embodiment of the present disclosure is a bit synchronous mapping procedure (BMP, Bit Synchronous Mapping Procedure).

Further, the preset mapping manner in this embodiment of the present disclosure may be an asynchronous mapping manner. It should be noted that if the transmitter uses the asynchronous mapping manner, corresponding overhead information is generated in an asynchronous mapping process.

For example, the asynchronous mapping manner in this embodiment of the present disclosure is a Generic Mapping Procedure (GMP), and overhead information generated in the asynchronous mapping process is Cnd and Cm. For specific explanations of Cnd and Cm, refer to the G.709 protocol.

It should be noted that regardless whether the transmitter uses the bit synchronous mapping manner or the asynchronous mapping manner, in a mapping process, a ratio of mapping granularities used by the groups of optical channel unit subframe signals is the same as a ratio of quantities of optical channel unit subframes included by the groups of optical channel unit subframe signals.

Optionally, the method for mapping, by the transmitter, the to-be-transmitted optical channel unit signal to the X first optical channel physical link signals is: mapping, by the transmitter, the to-be-transmitted optical channel unit signal to an optical channel physical link signal of a same rate as the to-be-transmitted optical channel unit signal; and dividing, by the transmitter, the optical channel physical link signal of a same rate as the optical channel unit signal into X preset groups.

In this embodiment of the present disclosure, $m_i$ of all the X second optical channel physical link signals may be the same, may be different, or may be partially the same. That is, any j of the X second optical channel physical link signals of $m_i$ times the benchmark rate have a same $m_i$, where $2 \leq j \leq X$.

By performing step S102, the transmitter adds a link sequence indicator overhead to each of the X first optical channel physical link signals, to generate X second optical channel physical link signals.

The link sequence indicator overhead of each first optical channel physical link signal is used to indicate an order of the first optical channel physical link signal. That is, the link sequence indicator overhead of each first optical channel physical link signal is used to indicate a sequence number of the current first optical channel physical link signal in the X first optical channel physical link signals.

Specifically, the transmitter first performs link sequence numbering processing on the X first optical channel physical link signals. Then, the transmitter respectively and synchronously adds link sequence numbers of the X signals to the link sequence indicator overheads of all the X first optical channel physical link signals.

Specifically, the transmitter adds the link sequence indicator overhead to an overhead range of the frame structure of each first optical channel physical link signal or the transmitter adds the link sequence indicator overhead to a frame header of the frame structure of each first optical channel physical link signal.

Specifically, if the first optical channel physical link signal is a first optical channel transport unit $OTUKm_i$ signal, the transmitter adds the link sequence indicator overhead to an overhead range of a frame structure of each first optical channel transport unit $OTUKm_i$ signal. If the first optical channel physical link signal is a signal whose payload area of an FEC frame is an $OTUKm_i$ of $m_i$ times the benchmark rate, the transmitter adds the link sequence indicator overhead to the frame header of the frame structure of each first optical channel physical link signal.

Further, the transmitter may further add an extended multiframe indicator overhead and a link group indicator overhead to each of the X first optical channel physical link signals. The extended multiframe indicator overhead is used to indicate a transmission delay, and the link group indicator overhead is used to indicate whether the X first optical channel physical link signals have a same source. A receiver can determine, according to the link group indicator overhead, whether the X first optical channel physical link signals are sent by a same transmitter.

Further, the transmitter further adds first overhead information to each of the X first optical channel physical link signals.

The first overhead information is used to indicate link bandwidth adjustment of the X first optical channel physical link signals, and the first overhead information includes at least a link bandwidth adjustment request, a link bandwidth adjustment response, and a link member status indication. If a link bandwidth of the X first optical channel physical link signals does not meet a requirement, the link bandwidth of the X first optical channel physical link signals may be adjusted according to the first overhead information.

Further, if the first optical channel physical link signal is the first optical channel transport unit $OTUKm_i$ signal, the frame structure of the first $OTUKm_i$ signal includes $m_i$ $OTUKm_i$ subframes. The transmitter further adds a sub-frame sequence indicator overhead (OTUK ID, OTUK Identifier) to each of X first $OTUKm_i$ signals, where the OTUK ID is used to indicate an order of $m_i$ OTU subframes in each first $OTUKm_i$ signal.

Specially, if $m_i=1$, an OTUK ID and a link sequence indicator overhead of each first optical channel transport unit OTUK1 signal both indicate an order of the first optical channel transport unit OTUK1 signal in the X first $OTUKm_i$ signals. Therefore, the OTUK ID may substitute for the link sequence indicator overhead.

Optionally, the transmitter performs overall numbering on all the X OTUK1 signals as 1, 2, . . . , and X, and respectively and synchronously adds the X numbers to link sequence indicator overheads of all the X OTUK1 signals, but no longer adds any OTUK ID.

Further, if the first optical channel physical link signal is the first optical channel transport unit $OTUKm_i$ signal, the transmitter further separately generates and adds link segment monitoring overhead information SM to each of the X second optical channel transport unit $OTUKm_i$ signals.

Further, the transmitter adds a frame header indication overhead FAS to each of the X second optical channel transport unit $OTUKm_i$ signals. That is, a pattern oxf6f62828 is added to the first row and the second to the fifth columns of each OTU subframe. For specific information of the pattern oxf6f62828, refer to the existing protocol.

Further, the transmitter further adds a Logical Lane Marker (LLM) to each of the X second optical channel transport unit $OTUKm_i$ signals. The LLMs are used as markers for multiple logical channels. LLMs of all subframes in the frame structure of each second optical channel transport unit $OTUKm_i$ signal are the same. An initial value of an LLM is 0, values of all LLMs are in ascending order, and a value range of the LLM is 0 to 239.

For example, if the first optical channel physical link signal is a first optical channel transport unit $OTUCm_i$ signal, after adding a link sequence indicator overhead to each $OTUCm_i$, the transmitter generates a second $OTUCm_i$ signal.

Figure 5:
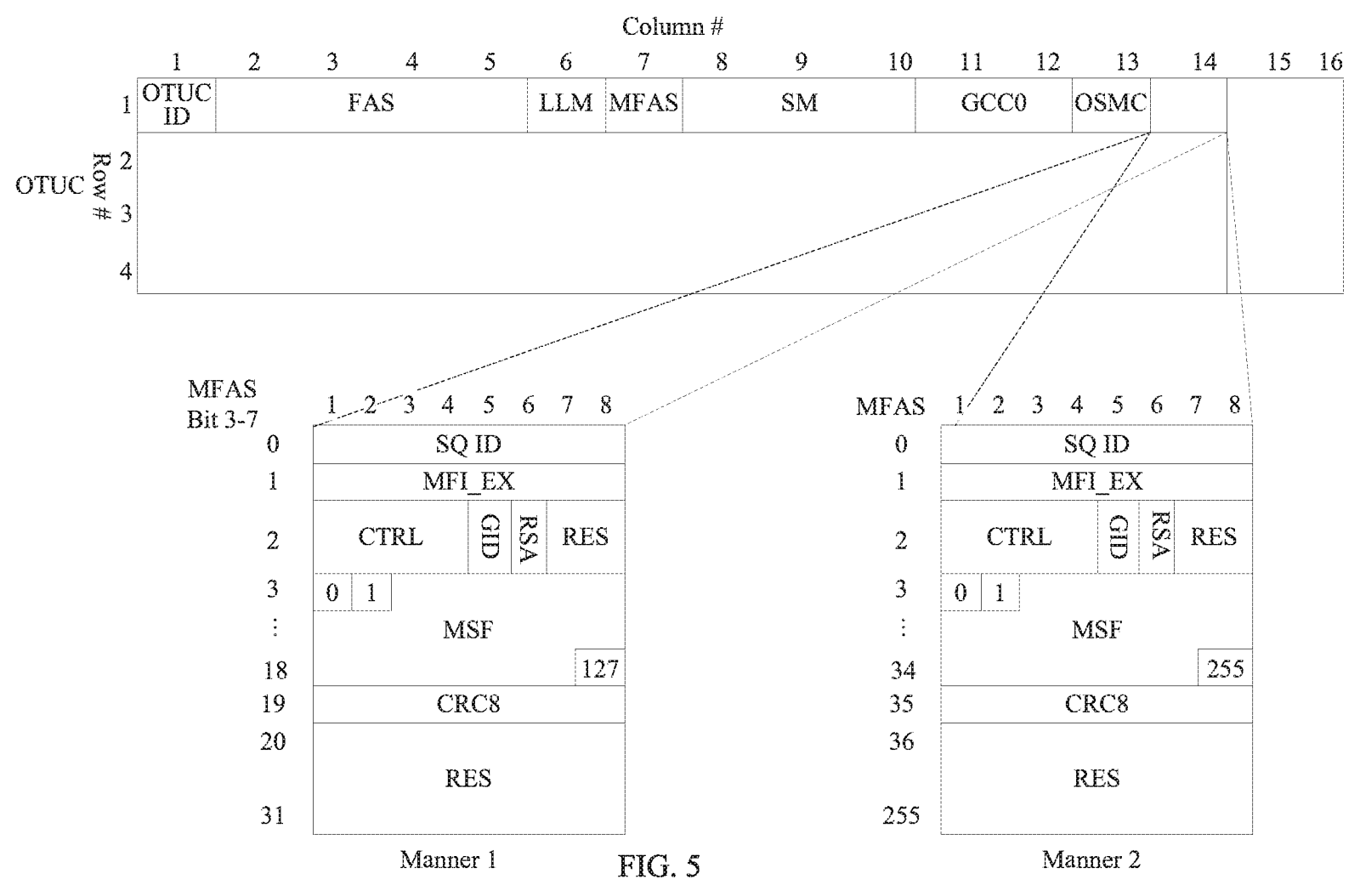

As shown in FIG. 5, the link sequence indicator overhead (SQ ID, Sequence Identifier) in the frame structure of the second $OTUCm_i$ signal is located in the first row and the $14^{th}$ column of the first OTU subframe of the $OTUCm_i$. The SQ ID is indicated in a multiframe manner. Specifically, the SQ ID is indicated by 32-frame multiframe. When the multiframe indicates that bits 3-7 of an MFAS are 0s, a value at the position is the link sequence indicator overhead. The SQ ID is indicated by 256-frame multiframe. When bits 0-7 of an MFAS are 0s, a value at the position is the link sequence indicator overhead.

An Extended Multi-frame Identifier (MFI_EX) is located in the first row and the $14^{th}$ column of the OTU subframe of the $OTUCm_i$, and is used to indicate a transmission delay. The MFI_EX is indicated in a multiframe manner. Manner 1: Specifically, the MFI_EX is indicated by 32-frame multiframe. When the multiframe indicates that bits 3-7 of an MFAS are 0s, a value at the position is the extended multiframe indicator overhead. An initial value of the MFI_EX is 0, and the value is increased by 1 every 32-frame multiframe, until the value is increased to 255. Subsequently, the value changes to 0 again in a next 32-frame multiframe. The MFI_EX is indicated by 256-frame multiframe. When bits 0-7 of an MFAS are 0s, a value at the position is the extended multiframe indicator overhead. An initial value of the MFI_EX is 0, and the value is increased by 1 every 256-frame multiframe, until the value is increased to 255. Subsequently, the value changes to 0 again in a next 256-frame multiframe.

In addition, in FIG. 4, the frame structure of the second $OTUCm_i$ signal further includes a Control Command (CTRL), a link bandwidth adjustment response (RSA, Respond Acknowledge), a link group indicator overhead (GID), a link member status indication (MSF), and cyclic redundancy check information (e.g., Cyclic Redundancy Check-8 bits (CRC8)).

The CTRL is used to indicate a specific operation (for example, increasing or decreasing) of link bandwidth adjustment of the X first optical channel physical link signals. The RSA is used to respond to the CTRL, and a destination of the RSA is the transmitter. The GID is used to indicate whether the X first optical channel physical link signals have a same source. The MSF is used to indicate a current status of each signal of the X first optical channel physical link signals. The CRC8 is used to store check information after 8-bit cyclic redundancy check is performed on CTRL, RSA, GID, and MSF overhead area information.

Further, by performing S103, the transmitter modulates and sends the X second optical channel physical link signals by using X preset optical modules in a one-to-one correspondence manner.

Specifically, the transmitter modulates the $q^{th}$ ($X \geq q \geq 1$) second optical channel physical link signal by using the $q^{th}$ preset optical module, and sends the modulated $q^{th}$ ($X \geq q \geq 1$) second optical channel physical link signal by using the $q^{th}$ optical fiber.

The transmitter modulates the $q^{th}$ third optical channel physical link signal based on the $q^{th}$ preset optical module, to generate one or more optical carrier signals. Subsequently, the transmitter sends the one or more optical carrier signals by using the $q^{th}$ optical fiber.

Further, before the transmitter modulates the X second optical channel physical link signals by using the X preset optical modules in the one-to-one correspondence manner, the transmitter performs forward error correction FEC encoding processing on the X second optical channel physical link signals. In the process of performing forward error correction FEC encoding processing on the X second optical channel physical link signals by the transmitter, FEC overhead information needs to be added.

The transmitter performs FEC encoding processing on the X second optical channel physical link signals, and adds the FEC overhead information, so that a link error code correction capability can be enhanced, and a generated third optical channel physical link signal can be made closer to the bearer rate of the preset optical modules.

For example, Table 1 shows rates before and after FEC processing is performed on ODU4, OTU4, and OTUC1.

If n OTUC1s are transferred by using OTU4 optical modules, and the transmitter selects RS (544, 514) to perform FEC encoding on an OTUC1, a rate of the OTUC1 after the encoding is:

99.5328×239/226×544/514=111.401609 Gbit/s.

Further, the transmitter adds an FEC frame header and an idle bit to construct an FEC frame signal, so that a final rate is equal to an OTU4 rate.

For example, a constructed FEC frame has 4096 rows, and each row has 5440 bits. A frame header of the FEC frame has 1285 bits, and the 1285 bits are the first 1285 bits in the first row. The FEC check information is placed in the last 300 bits of each of the first row to the 4096$^{th}$ row. A stuffing area has 75610 bits in total (where from the first row to the 3465$^{th}$ row, 20 bits of stuffing are added to each row; and from the 3466$^{th}$ to the 4096$^{th}$ row, 10 bits of stuffing are added to each row), and the remaining is a payload area, used to place an OTUC1 signal. An FEC frame constructed in this manner has the following final rate:

99.5328×239/226×544/514×(5140×4096)/((5140×4096)−1285−75610)=111.8099808 Gbit/s, where 111.8099808 Gbit/s is approximately equal to a rate of the OTU4, 111.809973568 Gbit/s.

Further, if the first optical channel physical link signal of $m_i$ times the benchmark rate in this embodiment of the present disclosure is a signal whose payload area of an FEC frame is an OTUKm$_i$ of $m_i$ times the benchmark rate, the FEC frame constructed by the transmitter has the following final rate:

99.5328×239/226×544/514×(5140×4096)/((5140×4096)−1280)=111.4083825 Gbit/s

In such an application scenario, an optical module of 100 G needs to be capable of supporting such a rate.

TABLE 1

|  | Without FEC | With FEC |
|---|---|---|
| ODU4 | 104.794445815 Gbit/s (239/227 × 99.5328 Gbit/s) | — |
| OTU4 | — | 111.809973568 Gbit/s (255/227 × 99.5328 Gbit/s) |
| OTUC1 | 105.258138053 Gbit/s (239/226 × 99.5328 Gbit/s) | — |

This embodiment of the present disclosure provides a signal sending method. After mapping a to-be-transmitted optical channel unit signal of n times a benchmark rate to X first optical channel physical link signals of $m_i$ times the benchmark rate, a transmitter adds a link sequence indicator overhead to each first optical channel physical link signal of $m_i$ times the benchmark rate of the X first optical channel physical link signals of $m_i$ times the benchmark rate, to generate X second optical channel physical link signals of $m_i$ times the benchmark rate, where n≥2, X≥2, $m_i$≥1, $m_1+m_2+\ldots+m_i+\ldots+m_X=n$, and the link sequence indicator overhead of each first optical channel physical link signal is used to indicate an order of the first optical channel physical link signal, and then the transmitter modulates and sends the X second optical channel physical link signals of $m_i$ times the benchmark rate by using X preset optical modules in a one-to-one correspondence manner.

By means of this solution, an optical channel unit signal of n times a benchmark rate is no longer mapped to a first optical channel physical link signal of a same rate as the optical channel unit signal, but is mapped to X first optical channel physical link signals of $m_i$ times the benchmark rate. The rate of the first optical channel physical link signal is $m_i$ times the benchmark rate, and $m_1+m_2+\ldots+m_i+\ldots+m_X=n$. Therefore, the rate of the first optical channel physical link signal is less than the rate of the optical channel unit signal. That is, in the present disclosure, the optical channel unit signal is decomposed into X low-rate signals. Subsequently, the X low-rate signals are modulated and sent by using X preset optical modules. By means of the present disclosure, X existing low-rate optical modules can be used to modulate X signals, and an optical module that matches a rate corresponding to an optical channel unit signal is no longer used for modulation, thereby reducing network costs when optical channel units of different rates need to use optical modules of different rates to perform modulation.

Further, if the optical channel unit signal is an optical channel data unit ODUKn signal, and the benchmark rate is 100 G, the ODUKn signal in this embodiment of the present disclosure is an optical channel data unit ODUCn signal of a rate of n*100 G. In such an application scenario, the present disclosure can reduce network costs for sending ODUCns of different rates.

Embodiment 2

Figure 6:
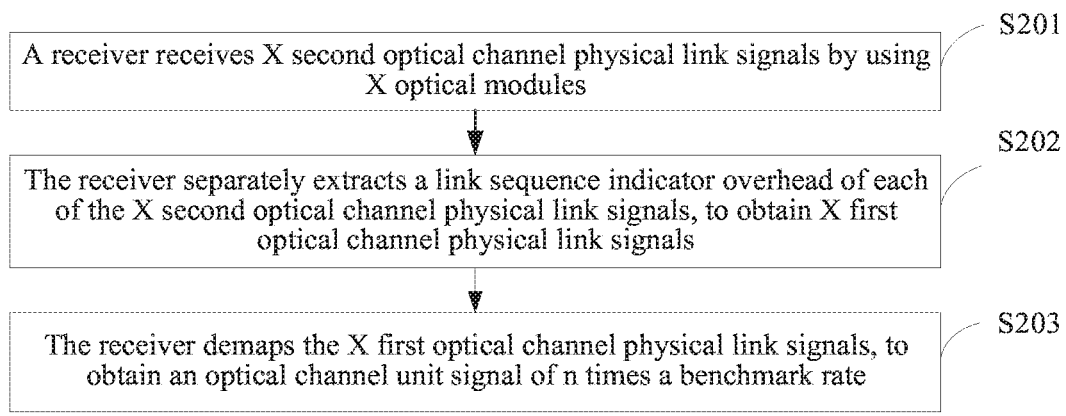
FIG. 6 is a schematic flowchart of a signal receiving method according to an embodiment of the present disclosure.

As shown in FIG. 6, this embodiment of the present disclosure provides a signal receiving method, including the following steps.

In step S201, a receiver receives X second optical channel physical link signals by using X optical modules.

A rate of the second optical channel physical link signal is $m_i$ times a benchmark rate, $m_i$≥1, and X≥2.

In step S202, the receiver separately extracts a link sequence indicator overhead of each of the X second optical channel physical link signals, to obtain X first optical channel physical link signals.

The link sequence indicator overhead of each second optical channel physical link signal is used to indicate an order of a first optical channel physical link signal that corresponds to the second optical channel physical link signal, and a rate of the first optical channel physical link signal is $m_i$ times the benchmark rate.

In step 203, the receiver demaps the X first optical channel physical link signals, to obtain an optical channel unit signal of n times a benchmark rate, where n≥2, and $$\sum_{i=1}^{X} m_i = n.$$

It should be noted that the benchmark rate in this embodiment of the present disclosure may be 100 G, or may be 40 G. This is not specifically limited in this embodiment of the present disclosure.

In this embodiment of the present disclosure, $m_i$ of all the X second optical channel physical link signals of $m_i$ times the benchmark rate may be the same, may be different, or may be partially the same. That is, any j of the X second optical channel physical link signals of $m_i$ times the benchmark rate have a same $m_i$, where 2≤j≤X.

Optionally, if the second optical channel physical link signal is a second optical channel transport unit OTUKm$_i$ signal, the optical channel unit signal of n times the benchmark rate is an optical channel data unit ODUKn signal of n times the benchmark rate. K is a level of an ODU or a level of an OTU. K is a positive integer, and a value of K is not specifically limited in this embodiment of the present disclosure.

For example, if the benchmark rate is 100 G, the ODUKn signal is an optical channel data unit ODUCn signal of a rate of n*100 G, and the OTUKm$_i$ signal is an optical channel transport unit OTUCm$_i$ signal of a rate of m$_i$*100 G, where C is a roman numeral for 100, and n and m$_i$ are both positive integers.

Optionally, if the second optical channel physical link signal is a second optical channel transport unit OTUKm$_i$ signal, the optical channel unit signal of n times the benchmark rate is an optical channel payload unit OPUKn signal of n times the benchmark rate. Similarly, K is a level of an OPU or a level of an OTU, K is a positive integer, and a value of K is not specifically limited in this embodiment of the present disclosure.

For example, if the benchmark rate is 100 G, the OPUKn signal is an optical channel payload unit OPUCn signal of a rate of n*100 G, and the OTUKm$_i$ signal is an optical channel transport unit OTUCm$_i$ signal of a rate of m$_i$*100 G, where C is a roman numeral for 100, and n and m$_i$ are both positive integers.

Optionally, if the second optical channel physical link signal is a signal whose payload area of an FEC frame is an OTUKm$_i$ of m$_i$ times the benchmark rate, the optical channel unit signal of n times the benchmark rate is an optical channel transport unit OTUKn signal of n times the benchmark rate. Similarly, K is a level of an OTU, K is a positive integer, and a value of K is not specifically limited in this embodiment of the present disclosure.

For example, if the benchmark rate is 100 G, the OTUKm$_i$ signal is an optical channel transport unit OTUCm$_i$ signal of a rate of m$_i$*100 G, and the OTUKn signal is an OTUCn signal of a rate of n*100 G, where C is a roman numeral for 100, and n and m$_i$ are both positive integers.

By performing S201, a receiver receives X second optical channel physical link signals by using X optical modules.

Specifically, the receiver receives M optical carrier signals by using X optical fibers, where at least one optical carrier signal is received by using each optical fiber, and M≥X≥2. The receiver demodulates the M optical carrier signals by using X preset optical modules, to obtain the X second optical channel physical link signals, where a rate of the second optical channel physical link signal is m$_i$ times the benchmark rate, m$_i$≥1 and X≥2.

Specifically, if a frame structure of the second optical channel physical link signal includes multiple second optical channel physical link subframes, the transmitter identifies a frame header of each second optical channel physical link subframe in each second optical channel physical link signal, and performs frame header alignment and sorting processing on all the subframes.

Further, if the second optical channel physical link signal is the second OTUKm$_i$ signal, the transmitter identifies frame header overheads carried by m$_i$ second OTU subframes in a frame structure of each second OTUKm$_i$ signal. (For each OTU subframe, the transmitter determines a frame header of each OTU subframe by identifying a special pattern of a frame header overhead FAS), and frame header alignment processing is performed on the m$_i$ second OTU subframes of the second OTUKm$_i$ signal.

By performing step S202, the receiver separately extracts a link sequence indicator overhead of each of the X second optical channel physical link signals, to obtain X first optical channel physical link signals.

The link sequence indicator overhead of each second optical channel physical link signal is used to indicate an order of a first optical channel physical link signal that corresponds to the second optical channel physical link signal.

Further, the receiver may further separately extract an extended multiframe indicator overhead and a link group indicator overhead of each of the X second optical channel physical link signals. The extended multiframe indicator overhead is used to indicate a transmission delay, and the link group indicator overhead is used to indicate whether the X first optical channel physical link signals have a same source.

Specifically, the receiver extracts the link sequence indicator overhead in each second optical channel physical link signal, and aligns the link sequence indicator overheads.

Further, the receiver identifies a link sequence number of each first optical channel physical link signal according to a link sequence indicator, and performs resorting processing on the X first optical channel physical link signals, to generate X first optical channel physical link signals.

It should be noted that an order of performing the resorting processing and the alignment processing is not limited in this embodiment of the present disclosure.

By performing S203, the receiver demaps the X first optical channel physical link signals, to obtain an optical channel unit signal of n times the benchmark rate, where n≥2, and $$\sum_{i=1}^{X} m_i = n.$$

Specifically, the receiver demaps the X first optical channel physical link signals in a preset demapping manner, to obtain X groups of optical channel unit signals, where the preset demapping manner is bit synchronous demapping or asynchronous demapping, and a rate of each group of optical channel unit signals is m$_i$ times the benchmark rate.

The preset demapping manner in this embodiment of the present disclosure may be bit synchronous demapping.

Further, the preset demapping manner in this embodiment of the present disclosure may be asynchronous demapping. It should be noted that if the receiver uses the asynchronous demapping manner, to demap the X first optical channel physical link signals to X groups of optical channel unit subframe signals, before the asynchronous demapping, the receiver first needs to extract mapping overhead information.

Specifically, all subframes in a frame structure of the X groups of optical channel unit signals maintain frame alignment, and a frame structure of each group of optical channel unit subframe signals includes m$_i$ optical channel unit subframes.

Further, the receiver combines the X groups of optical channel unit signals, to generate the optical channel unit signal.

Further, before S202 is performed, the receiver may further perform forward error correction FEC decoding on the X second optical channel physical link signals.

This embodiment of the present disclosure provides a signal receiving method. After receiving X second optical channel physical link signals of m$_i$ times a benchmark rate by using X optical modules, a receiver separately extracts a link sequence indicator overhead of each of the X second optical channel physical link signals, to obtain X first optical channel physical link signals, where m$_i$≥1, and X≥2, the link sequence indicator overhead of each second optical channel physical link signal is used to indicate an order of a first optical channel physical link signal that corresponds to the second optical channel physical link signal, and then the receiver demaps the X first optical channel physical link signals, to obtain an optical channel unit signal of n times the benchmark rate, where n≥2, and m$_1$+m$_2$+ . . . +m$_i$+ . . . +m$_X$=n.

By means of this solution, after performing related processing on the received X second optical channel physical link signals of m$_i$ times the benchmark rate, the receiver obtains X first optical channel physical link signals of $m_i$ times the benchmark rate, and the receiver obtains the optical channel unit signal of n times the benchmark rate by demapping the X first optical channel physical link signals. The rate of the first optical channel physical link signal is $m_i$ times the benchmark rate, and $m_1+m_2+\ldots m_i+\ldots+m_X=n$. Therefore, the rate of the first optical channel physical link signal is less than the rate of the optical channel unit signal. That is, the rate of the second optical channel physical link signal is less than the rate of the optical channel unit signal. In this way, the receiver demodulates M optical carrier signals by using X existing low-rate optical modules, and no longer uses an optical module that matches a rate corresponding to the optical channel unit signal to perform demodulation, thereby reducing network costs when optical channel units of different rates need to use optical modules of different rates to perform demodulation.

Further, if the optical channel unit signal is an optical channel data unit ODUKn signal, and the benchmark rate is 100 G, the ODUKn signal in this embodiment of the present disclosure is an optical channel data unit ODUCn signal of a rate of n*100 G. In such an application scenario, the present disclosure can reduce network costs for sending ODUCns of different rates.

Embodiment 3

Figure 7:
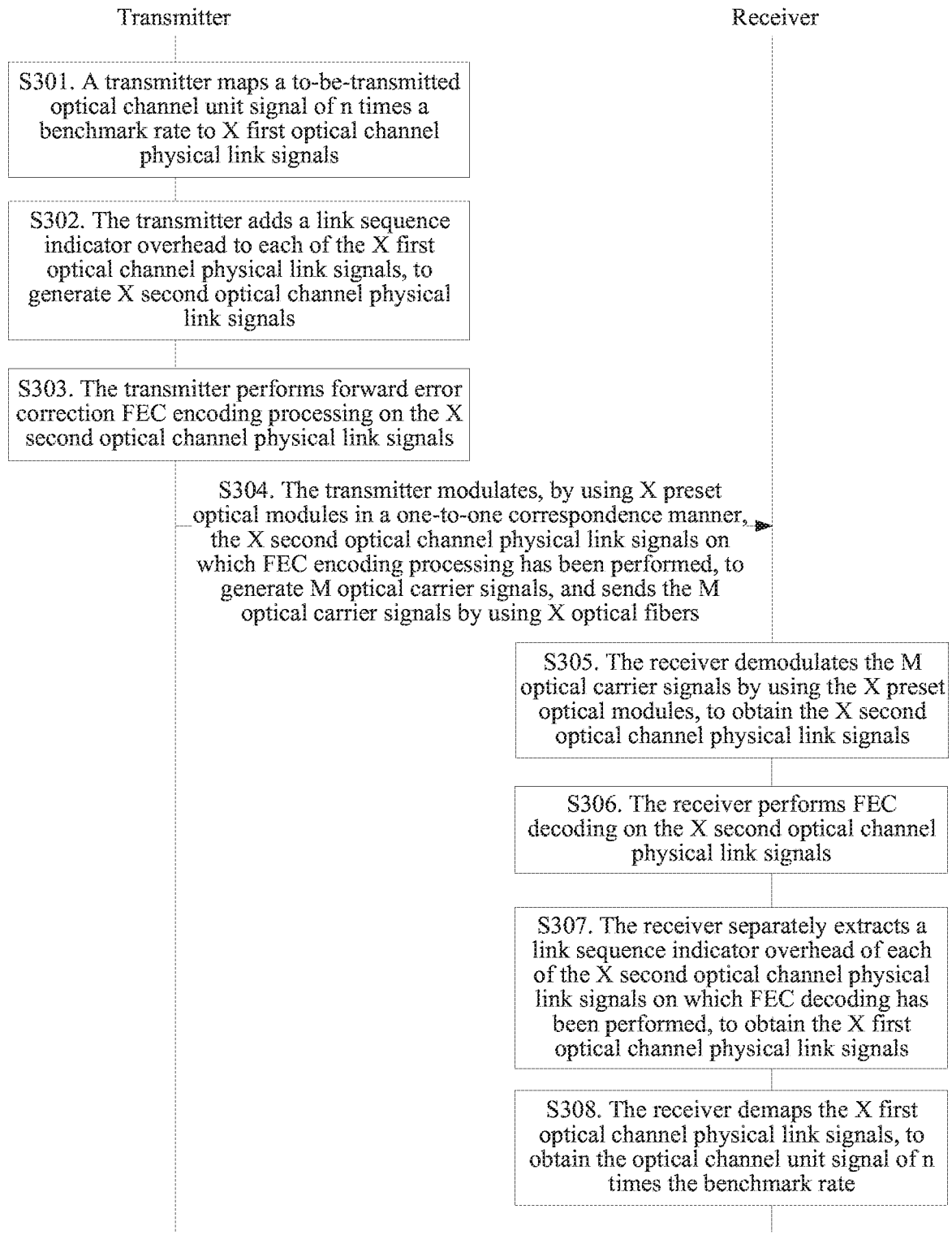
FIG. 7 is a first schematic flowchart of a signal sending and receiving method according to an embodiment of the present disclosure.

As shown in FIG. 7, this embodiment of the present disclosure provides a signal sending and receiving method, including the following steps.

In step S301, a transmitter maps a to-be-transmitted optical channel unit signal of n times a benchmark rate to X first optical channel physical link signals.

A rate of the first optical channel physical link signal is $m_i$ times the benchmark rate, $n\geq 2$, $X\geq 2$, $m_i\geq 1$, and $$\sum_{i=1}^{X} m_i = n.$$

In step S302, the transmitter adds a link sequence indicator overhead to each of the X first optical channel physical link signals, to generate X second optical channel physical link signals.

In step S303, the transmitter performs forward error correction FEC encoding processing on the X second optical channel physical link signals.

In step S304, the transmitter modulates, by using X preset optical modules in a one-to-one correspondence manner, the X second optical channel physical link signals on which FEC encoding processing has been performed, to generate M optical carrier signals, and sends the M optical carrier signals by using X optical fibers.

In step S305, the receiver demodulates the M optical carrier signals by using the X preset optical modules, to obtain the X second optical channel physical link signals.

A rate of the second optical channel physical link signal is mi times the benchmark rate, mi≥1, and X≥2.

In step S306, the receiver performs FEC decoding on the X second optical channel physical link signals.

In step S307, the receiver separately extracts a link sequence indicator overhead of each of the X second optical channel physical link signals on which FEC decoding has been performed, to obtain the X first optical channel physical link signals.

The link sequence indicator overhead of each second optical channel physical link signal is used to indicate an order of a first optical channel physical link signal that corresponds to the second optical channel physical link signal, and a rate of the first optical channel physical link signal is $m_i$ times the benchmark rate.

In step S308, the receiver demaps the X first optical channel physical link signals, to obtain the optical channel unit signal of n times the benchmark rate, where n≥2, and $$\sum_{i=1}^{X} m_i = n.$$

It should be noted that the benchmark rate in this embodiment of the present disclosure may be 100 G, or may be 25 G. This is not specifically limited in this embodiment of the present disclosure.

In this embodiment of the present disclosure, $m_i$ of all the X second optical channel physical link signals may be the same, may be different, or may be partially the same. That is, any j of the X second optical channel physical link signals of $m_i$ times the benchmark rate have a same $m_i$, where 2≥j≥X.

Optionally, if the optical channel unit signal of n times the benchmark rate is an optical channel data unit ODUKn signal of n times the benchmark rate, the first optical channel physical link signal of $m_i$ times the benchmark rate is a first optical channel transport unit OTUKm$_i$ signal of $m_i$ times the benchmark rate. K is a level of an ODU or a level of an OTU, K is a positive integer, and a value of K is not specifically limited in this embodiment of the present disclosure.

For example, if the benchmark rate is 100 G, the ODUKn signal is an optical channel data unit ODUCn signal of a rate of n*100 G, and the OTUKm$_i$ signal is an optical channel transport unit OTUCm$_i$ signal of a rate of m$_i$*100 G, where C is a roman numeral for 100, and n and m$_i$ are both positive integers.

Optionally, if the optical channel unit signal of n times the benchmark rate is an optical channel payload unit OPUKn signal of n times the benchmark rate, the first optical channel physical link signal of m$_i$ times the benchmark rate is a first optical channel transport unit OTUKm$_i$ signal of m$_i$ times the benchmark rate. Similarly, K is a level of an OPU or a level of an OTU, K is a positive integer, and a value of K is not specifically limited in this embodiment of the present disclosure.

For example, if the benchmark rate is 100 G, the OPUKn signal is an optical channel payload unit OPUCn signal of a rate of n*100 G, and the OTUKm$_i$ signal is an optical channel transport unit OTUCm$_i$ signal of a rate of m$_i$*100 G, where C is a roman numeral for 100, and n and m$_i$ are both positive integers.

Optionally, if the optical channel unit signal of n times the benchmark rate is an optical channel transport unit OTUKn signal of n times the benchmark rate, the first optical channel physical link signal of m$_i$ times the benchmark rate is an FEC frame whose payload area is an OTUKm$_i$ of m$_i$ times the benchmark rate. Similarly, K is a level of an OTU, K is a positive integer, and a value of K is not specifically limited in this embodiment of the present disclosure.

For example, if the benchmark rate is 100 G, the OTUKm$_i$ signal is an optical channel transport unit OTUCm$_i$ signal of a rate of $m_i*100$ G, and the OTUKn signal is an OTUCn signal of a rate of $n*100$ G, where C is a roman numeral for 100, and n and $m_i$ are both positive integers.

Steps S301 to S304 in this embodiment of the present disclosure are the same as the method described in Embodiment 1, and details are not described herein again.

Steps S305 to S308 in this embodiment of the present disclosure are the same as the method described in Embodiment 2, and details are not described herein again.

This embodiment of the present disclosure provides a signal sending and receiving method. After mapping a to-be-transmitted optical channel unit signal of n times a benchmark rate to X first optical channel physical link signals of $m_i$ times the benchmark rate, a transmitter adds a link sequence indicator overhead to each first optical channel physical link signal of $m_i$ times the benchmark rate of the X first optical channel physical link signals of $m_i$ times the benchmark rate, to generate X second optical channel physical link signals of $m_i$ times the benchmark rate, where $n \geq 2$, $X \geq 2$, $m_i \geq 1$, $m_1+m_2+ \ldots +m_i+ \ldots +m_X=n$, and the link sequence indicator overhead of each first optical channel physical link signal is used to indicate an order of the first optical channel physical link signal, and then the transmitter modulates and sends the X second optical channel physical link signals of $m_i$ times the benchmark rate by using X preset optical modules in a one-to-one correspondence manner.

By means of this solution, an optical channel unit signal of n times a benchmark rate is no longer mapped to a first optical channel physical link signal of a same rate as the optical channel unit signal, but is mapped to X first optical channel physical link signals of $m_i$ times the benchmark rate. The rate of the first optical channel physical link signal is $m_i$ times the benchmark rate, and $m_1+m_2+ \ldots +m_i+ \ldots m_X=n$. Therefore, the rate of the first optical channel physical link signal is less than the rate of the optical channel unit signal. That is, in the present disclosure, the optical channel unit signal is decomposed into X low-rate signals. Subsequently, the X low-rate signals are modulated and sent by using X preset optical modules. By means of the present disclosure, X existing low-rate optical modules can be used to modulate X signals, and an optical module that matches a rate corresponding to an optical channel unit signal is no longer used for modulation, thereby reducing network costs when optical channel units of different rates need to use optical modules of different rates to perform modulation.

Further, if the optical channel unit signal is an optical channel data unit ODUKn signal, and the benchmark rate is 100 G, the ODUKn signal in this embodiment of the present disclosure is an optical channel data unit ODUCn signal of a rate of $n*100$ G. In such an application scenario, the present disclosure can reduce network costs for sending ODUCns of different rates.

Embodiment 4

In the present disclosure, if an optical channel unit signal of n times a benchmark rate is an optical channel data unit ODUKn signal of n times the benchmark rate, a first optical channel physical link signal of $m_i$ times the benchmark rate is a first optical channel transport unit OTUKm$_i$ signal of $m_i$ times the benchmark rate. If an optical channel unit signal of n times a benchmark rate is an optical channel transport unit OTUKn signal of n times the benchmark rate, a first optical channel physical link signal of $m_i$ times the benchmark rate is a signal whose payload area of an FEC frame is an OTUKm$_i$ of $m_i$ times the benchmark rate. If an optical channel unit signal of n times a benchmark rate is an optical channel payload unit OPUKn signal of n times the benchmark rate, a first optical channel physical link signal of $m_i$ times the benchmark rate is a first optical channel transport unit OTUKm$_i$ signal of $m_i$ times the benchmark rate. If the benchmark rate is 100 G, the ODUKn signal is an optical channel data unit ODUCn signal of a rate of $n*100$ G, the OTUKm$_i$ signal is an optical channel transport unit OTUCm$_i$ signal of a rate of $m_i*100$ G, the OTUKn signal is an OTUCn signal of a rate of $n*100$ G, and the OPUKn signal is an optical channel payload unit OPUCn signal of a rate of $n*100$ G.

In this embodiment of the present disclosure, a signal sending and receiving method is described by using an example in which the optical channel unit signal of n times the benchmark rate is an ODUCn signal, and the first optical channel physical link signal of $m_i$ times the benchmark rate is a first OTUCm$_i$ signal.

Figure 8:
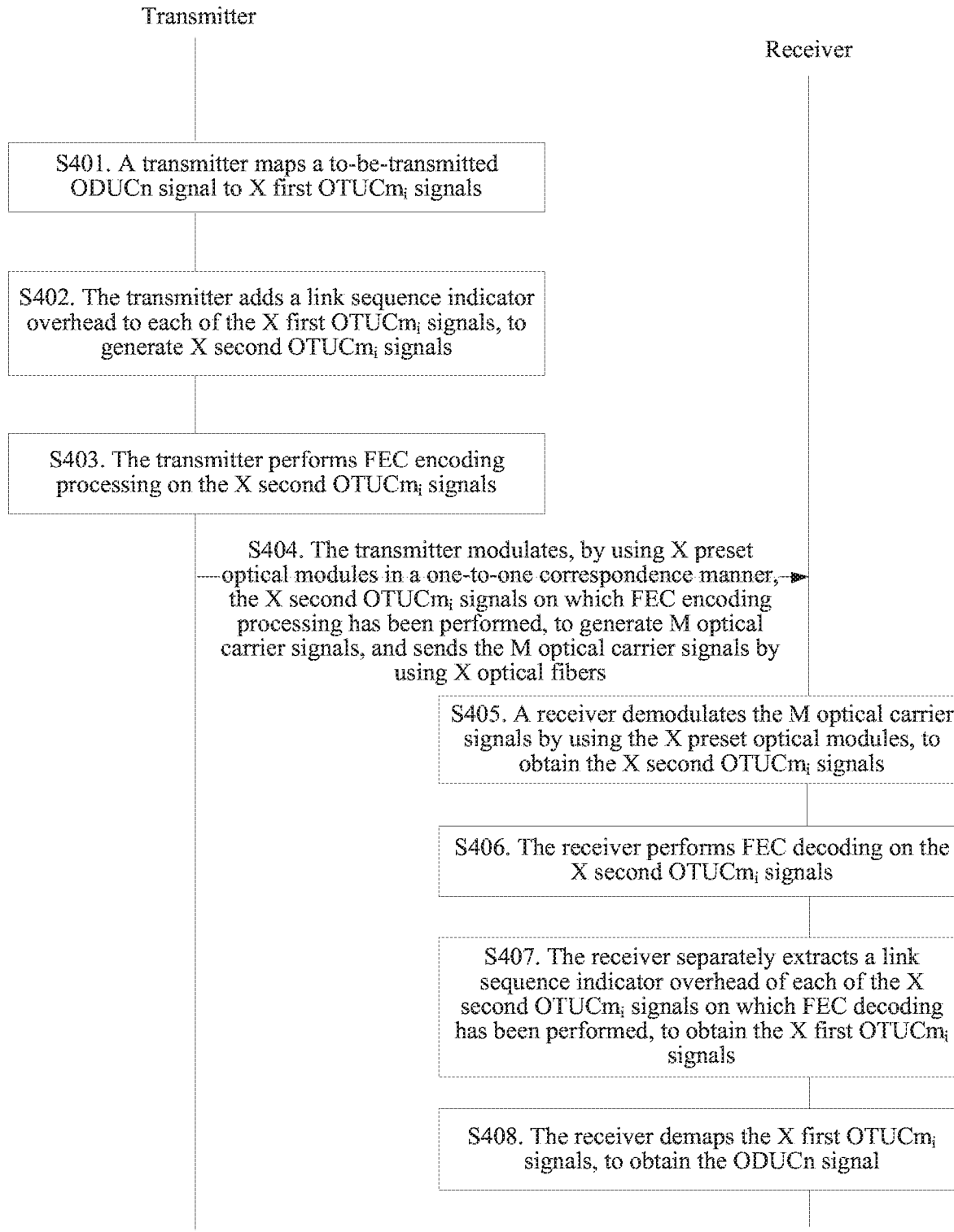
FIG. 8 is a second schematic flowchart of a signal sending and receiving method according to an embodiment of the present disclosure.

As shown in FIG. 8, this embodiment of the present disclosure provides a signal sending and receiving method, including the following steps.

In step S401, a transmitter maps a to-be-transmitted ODUCn signal to X first OTUCm$_i$ signals, where $n \geq 2$, $X \geq 2$, $m_i \geq 1$, and $$\sum_{i=1}^{X} m_i = n.$$

A method for mapping, by a transmitter, a to-be-transmitted ODUCn signal to X first OTUCm$_i$ signals may include: dividing, by the transmitter, n ODU subframes in a frame structure of the ODUCn signal into X preset groups according to a quantity of preset optical modules and a bearer rate of the preset optical modules, where each group of ODU subframes includes $m_i$ ODU subframes; and mapping, by the transmitter in a preset mapping manner, X groups of ODUCm$_i$ subframe signals that each include $m_i$ ODU subframes to X first OTUCm$_i$ signals.

The preset mapping manner in this embodiment of the present disclosure is bit synchronous mapping or asynchronous mapping.

Figure 9:
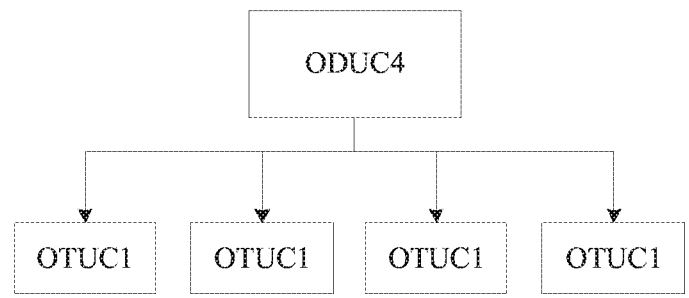
FIG. 9 is a second schematic diagram of a signal mapping procedure according to an embodiment of the present disclosure.
Figure 10:
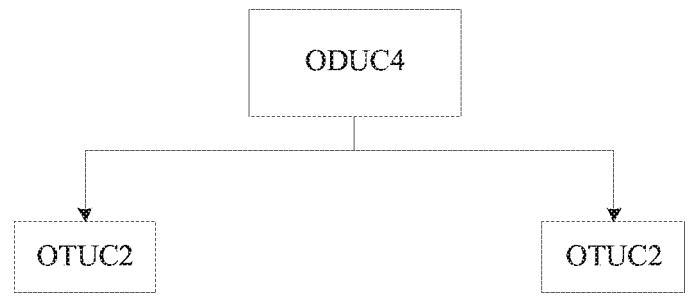
FIG. 10 is a third schematic diagram of a signal mapping procedure according to an embodiment of the present disclosure.
Figure 11:
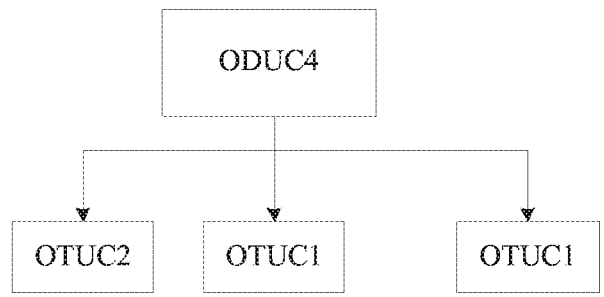
FIG. 11 is a fourth schematic diagram of a signal mapping procedure according to an embodiment of the present disclosure.

For example, as shown in FIG. 9, the transmitter maps an ODUC4 to four first OTUC1 signals. As shown in FIG. 10, the transmitter maps an ODUC4 to two first OTUC2 signals. As shown in FIG. 11, the transmitter maps an ODUC4 to two first OTUC1 signals and one first OTUC2 signal.

In step S402, the transmitter adds a link sequence indicator overhead to each of the X first OTUCm$_i$ signals, to generate X second OTUCm$_i$ signals.

The link sequence indicator overhead of each first OTUCm$_i$ signal is used to indicate an order of the first OTUCm$_i$ signal. That is, the link sequence indicator overhead of each first OTUCm$_i$ signal is used to indicate a sequence number of the current first OTUCm$_i$ signal in the X first OTUCm$_i$ signals.

Specifically, the transmitter first performs link sequence numbering processing on the X first OTUCm$_i$ signals. Then, the transmitter respectively and synchronously adds link sequence numbers of the X first OTUCm$_i$ signals to the link sequence indicator overheads of all the X first OTUCm$_i$ signals.

Further, the transmitter adds the link sequence indicator overhead to an overhead range of a frame structure of each first OTUCm$_i$ signal; or adds the link sequence indicator overhead to a frame header of a frame structure of each first OTUCm$_i$ signal.

Specifically, the transmitter adds the link sequence indicator overhead to the overhead range of the frame structure of each first $OTUCm_i$ signal.

Further, the transmitter may further add an extended multiframe indicator overhead and a link group indicator overhead to each of the X first $OTUCm_i$ signals. The extended multiframe indicator overhead is used to indicate a transmission delay, and the link group indicator overhead is used to indicate whether the X first $OTUCm_i$ signals have a same source. A receiver can determine, according to the link group indicator overhead, whether the X first $OTUCm_i$ signals are sent by a same transmitter.

Further, the transmitter further adds first overhead information to each of the X first $OTUCm_i$ signals.

The first overhead information is used to indicate link bandwidth adjustment of the X first $OTUCm_i$ signals, and the first overhead information includes at least a link bandwidth adjustment request, a link bandwidth adjustment response, and a link member status indication. If a link bandwidth of the X first $OTUCm_i$ signals does not meet a requirement, the link bandwidth of the X first $OTUCm_i$ signals may be adjusted according to the first overhead information.

Further, the transmitter further adds a subframe sequence indicator overhead OTUK ID to each of the X first $OTUCm_i$ signals, where the OTUK ID is used to indicate an order of $m_i$ OTU subframes in each first $OTUCm_i$ signal.

Specially, if $m_i=1$, the OTUK ID may substitute for the link sequence indicator overhead.

Further, the transmitter further separately generates and adds link segment monitoring overhead information SM to each of the X second $OTUCm_i$ signals.

Further, the transmitter adds a frame header indication overhead FAS to each of the X second $OTUCm_i$ signals. That is, a pattern oxf6f62828 is added to the first row and the second to the fifth columns of each OTU subframe. For specific information of the pattern oxf6f62828, refer to the existing protocol.

Further, the transmitter further adds a logical lane marker LLM to each of the X second $OTUCm_i$ signals. The LLMs are used as markers for multiple logical channels. LLMs of all subframes in a frame structure of each second $OTUCm_i$ signal are the same. An initial value of an LLM is 0, values of all LLMs are in ascending order, and a value range of the LLM is 0 to 239.

Figure 12:
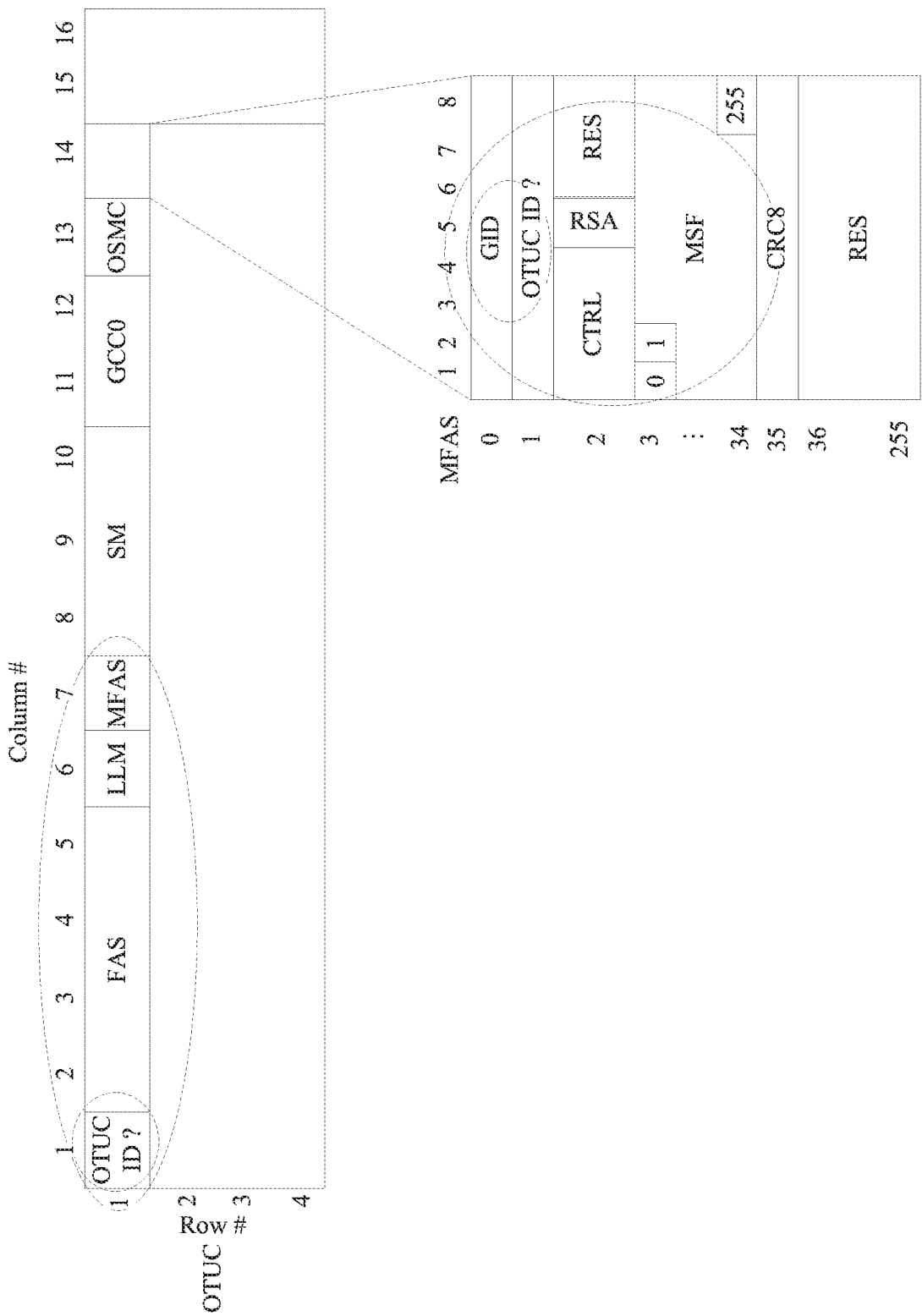
FIG. 12 is a first schematic diagram of a frame structure of an OTUC1 signal after overhead information is added according to an embodiment of the present disclosure.
Figure 13:
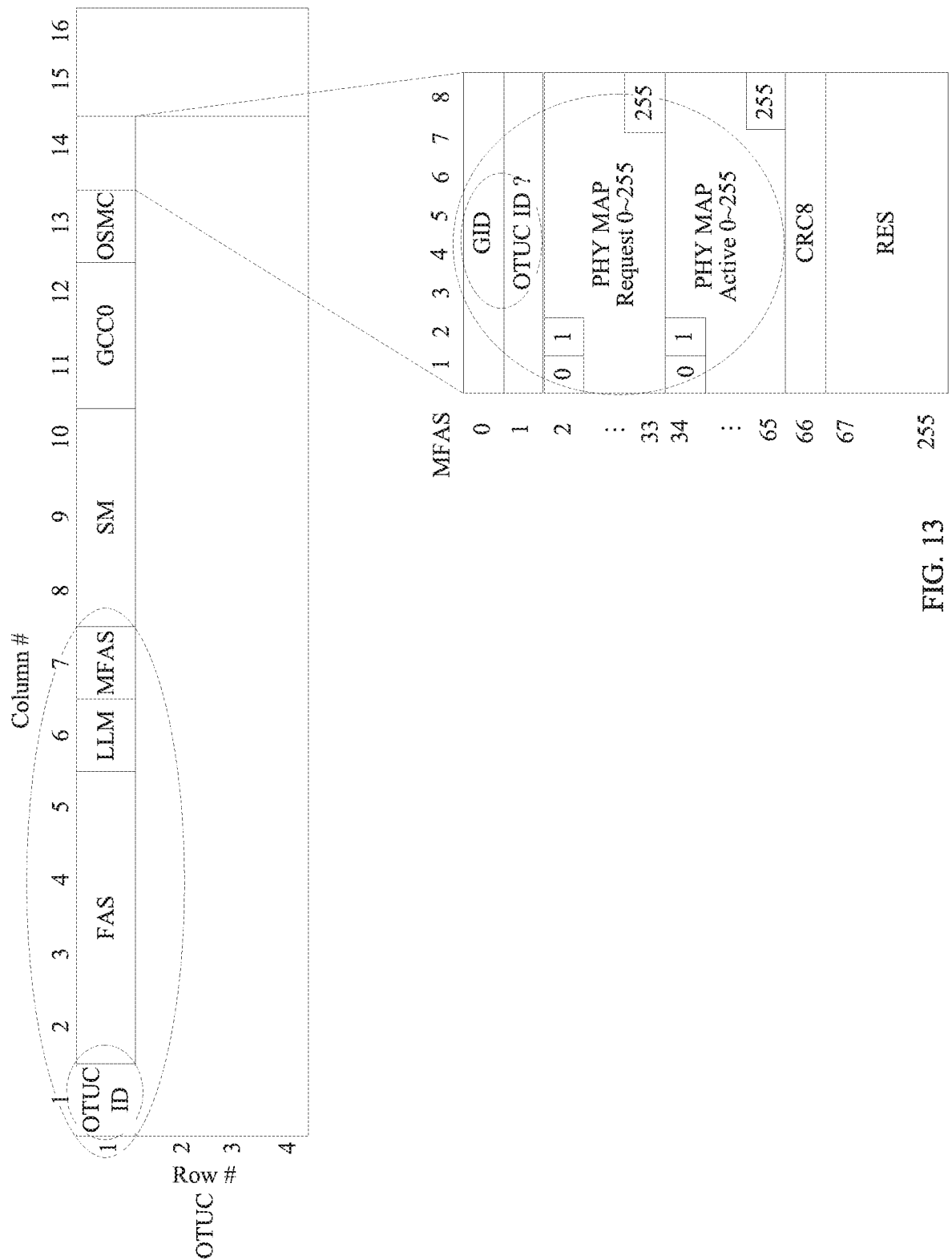
FIG. 13 is a second schematic diagram of a frame structure of an OTUC1 signal after overhead information is added according to an embodiment of the present disclosure.
Figure 14:
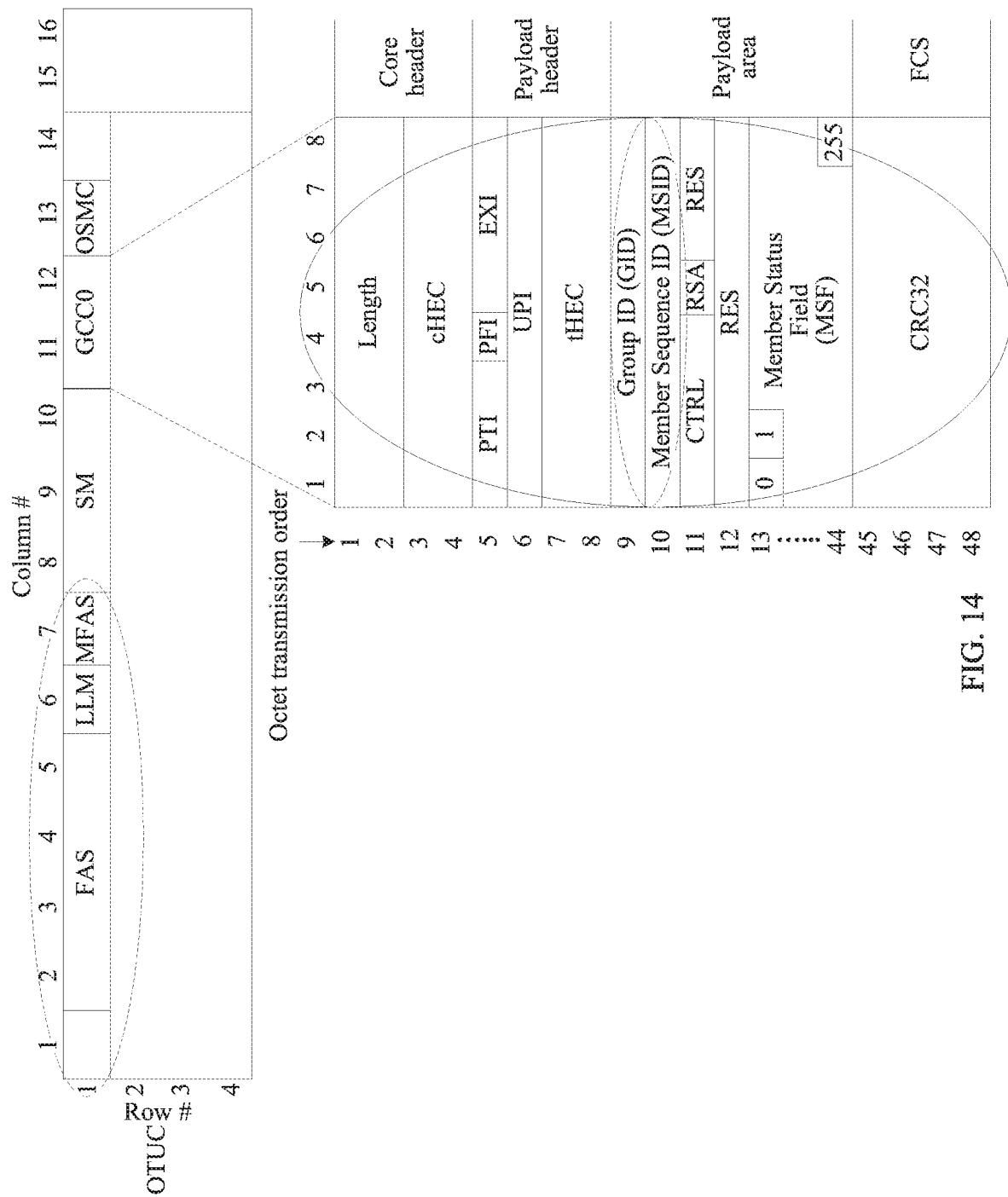
FIG. 14 is a third schematic diagram of a frame structure of an OTUC1 signal after overhead information is added according to an embodiment of the present disclosure.

For example, using a first OTUC1 signal as an example, a frame structure of the second OTUC1 signal is shown in FIG. 12, FIG. 13, or FIG. 14.

In FIG. 12, a GID is a group marker of an OTUC1-X. An OTUC ID may be placed in the first row and the first column of an OTUC frame, or may be placed in the first row and the $14^{th}$ column of an OTUC frame. The OTUC ID is indicated in a multiframe manner. When MFAS=1, a value of the OTUC ID is placed at the position, where X OTUC1s respectively correspond to values 1, 2, ..., and X. In this scenario, the OTUC ID may substitute for a function of a link sequence indicator overhead SQ ID, that is, the OTUC ID is the link sequence indicator overhead.

In FIG. 13, a GID is a group marker of an OTUC1-X. An OTUC ID may be placed in the first row and the first column of an OTUC frame, or may be placed in the first row and the $14^{th}$ column of an OTUC frame. The OTUC ID is indicated in a multiframe manner. When MFAS=1, a value of the OTUC ID is placed at the position, where X OTUC1s respectively correspond to values 1, 2, ..., and X. In this scenario, the OTUC ID may substitute for a function of a link sequence indicator overhead SQ ID, that is, the OTUC ID is the link sequence indicator overhead.

Second overhead information includes a PHY MAP Request, a PHY MAP Active, or the like. A function of each overhead field is described as follows.

PHY MAP Request: 256 bits. One bit corresponds to one OTUC1, and the zeroth to the $255^{th}$ bits respectively correspond to the first to the $256^{th}$ OTUT1. The PHY MAP Request is used for an increase request indication or a decrease request indication in an OTUC1-X bandwidth adjustment process. When the value changes from 0 to 1, it indicates an increase request. When the value changes from 1 to 0, it indicates a decrease request.

PHY MAP Active: 256 bits. One bit corresponds to one OTUC1, and the zeroth to the $255^{th}$ bits respectively correspond to the first to the $256^{th}$ OTUC1. The PHY MAP Active is used for a response in an OTUC1-X bandwidth adjustment process. When the value is 1, it indicates that a corresponding increase or decrease request is agreed to be performed. Otherwise, the value is 0.

CRC8: 8 bits, used to store check information after 8-bit cyclic redundancy check is performed on the foregoing overhead area information.

In FIG. 14, an overhead carrying manner of the second OTUC1 signal is different from those in FIG. 12 and FIG. 13. A Generic Framing Procedure (GFP) frame packet encapsulation manner is used for overhead carrying and transfer. First, the transmitter encapsulates some overheads in a GFP frame, and then transfers the GFP frame by using a GCC0 overhead channel of an OTUC1. In this case, the GFP frame includes a core frame header (four bytes), a payload frame header (four bytes, PTI=101, and encapsulation is performed by selecting a GFP communication management frame), a payload area (36 bytes, used to encapsulate a corresponding overhead of an OTU1-X), and a check area (CRC32). For a definition of the GFP frame, refer to a specific definition in the standard ITU-T G.7041.

Overheads encapsulated in the GFP frame include a GID, an MSID, CTRL, RAS, and an MSF. The GID is a group marker of the OTUC1-X. The MSID (Member Sequence ID) is an OTUC1 member sequence number in the OTUC1-X, equivalent to a function of the link sequence indicator overhead SQ, and a value of the MSID is 1, 2, ..., or X. For the remaining CTRL, RAS, MSF, or the like, a function of each overhead field is similar to that described in FIG. 4.

In step S403, the transmitter performs FEC encoding processing on the X second $OTUCm_i$ signals.

In step S404, the transmitter modulates, by using X preset optical modules in a one-to-one correspondence manner, the X second $OTUCm_i$ signals on which FEC encoding processing has been performed, to generate M optical carrier signals, and sends the M optical carrier signals by using X optical fibers.

In step S405, a receiver demodulates the M optical carrier signals by using the X preset optical modules, to obtain the X second $OTUCm_i$ signals.

A rate of the second $OTUCm_i$ signal is mi times a benchmark rate, $m_i \geq 1$, and $X \geq 2$.

In step S406, the receiver performs FEC decoding on the X second $OTUCm_i$ signals.

In step S407, the receiver separately extracts a link sequence indicator overhead of each of the X second $OTUCm_i$ signals on which FEC decoding has been performed, to obtain the X first $OTUCm_i$ signals.

The link sequence indicator overhead of each second OTUCmi signal is used to indicate an order of a first optical channel physical link signal that corresponds to the second optical channel physical link signal.

In step S408, the receiver demaps the X first OTUCm$_i$ signals, to obtain the ODUC$_n$ signal, where n≥2, and $$\sum_{i=1}^{X} m_i = n.$$

This embodiment of the present disclosure provides a signal sending and receiving method. After mapping a to-be-transmitted ODUC$_n$ signal to X first OTUCm$_i$ signals, a transmitter adds a link sequence indicator overhead to each of the X first OTUCm$_i$ signals, to generate X second OTUCm$_i$ signals, where n≥2, X≥2, m$_i$≥1, m$_1$+m$_2$+ ... +m$_i$+ ... m$_X$=n, and the link sequence indicator overhead of each first OTUCm$_i$ signal is used to indicate an order of the first OTUCm$_i$ signal, and then the transmitter modulates and sends the X second OTUCm$_i$ signals by using X preset optical modules in a one-to-one correspondence manner.

By means of this solution, an ODUCn signal is no longer mapped to an OTUCn signal of a same rate as the ODUCn signal, but is mapped to X first OTUCm$_i$ signals. A rate of the first OTUCm$_i$ signal is m$_i$ times a benchmark rate, and m$_1$+m$_2$+ ... +m$_i$+ ... +m$_X$=n, and therefore the rate of the first OTUCm$_i$ signal is less than the rate of the ODUCn signal. That is, in the present disclosure, the ODUCn signal is decomposed into X low-rate signals. Subsequently, the X low-rate signals are modulated and sent by using X preset optical modules. By means of the present disclosure, X existing low-rate optical modules can be used to modulate X signals, and an optical module that matches a rate corresponding to an optical channel unit signal is no longer used for modulation, thereby reducing network costs when optical channel units of different rates need to use optical modules of different rates to perform modulation.

Embodiment 5

Figure 15:
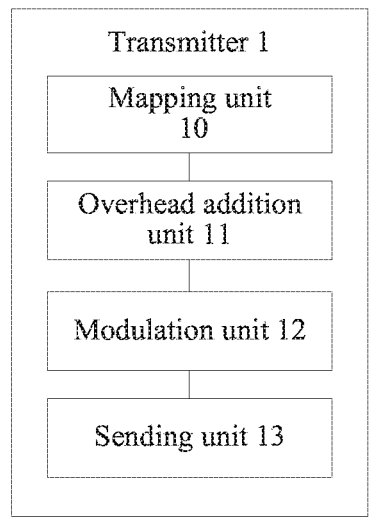
FIG. 15 is a first schematic structural diagram of a transmitter according to an embodiment of the present disclosure.

This embodiment of the present disclosure provides a transmitter 1. As shown in FIG. 15, the transmitter 1 includes: a mapping unit 10, configured to map a to-be-transmitted optical channel unit signal of n times a benchmark rate to X first optical channel physical link signals, where a rate of the first optical channel physical link signal is m$_i$ times the benchmark rate, n≥2, X≥2, m$_i$≥1, and $$\sum_{i=1}^{X} m_i = n.$$

The transmitter 1 further includes an overhead addition unit 11, configured to add a link sequence indicator overhead to each of the X first optical channel physical link signals obtained through mapping by the mapping unit 10, to generate X second optical channel physical link signals, where the link sequence indicator overhead of each first optical channel physical link signal is used to indicate an order of the first optical channel physical link signal, and a rate of the second optical channel physical link signal is m$_i$ times the benchmark rate. The transmitter 1 further includes a modulation unit 12, configured to modulate, by using X preset optical modules in a one-to-one correspondence manner, the X second optical channel physical link signals generated by the overhead addition unit 11. The transmitter 1 further includes a sending unit 13, configured to send the X second optical channel physical link signals modulated by the modulation unit 12.

Figure 16:
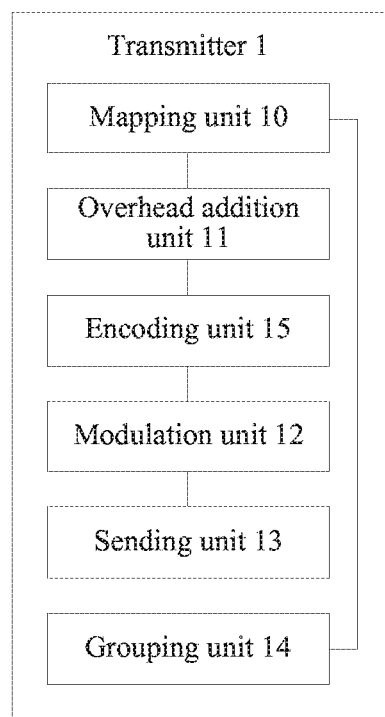
FIG. 16 is a second schematic structural diagram of a transmitter according to an embodiment of the present disclosure.

Further, as shown in FIG. 16, the transmitter 1 further includes a grouping unit 14, where the grouping unit 14 is configured to divide the to-be-transmitted optical channel unit signal of n times the benchmark rate into X preset groups.

Further, the mapping unit 10 is specifically configured to map the X groups of optical channel unit signals obtained through division by the grouping unit 14 to the X first optical channel physical link signals in a one-to-one correspondence manner and in a preset mapping manner, where the preset mapping manner is bit synchronous mapping or asynchronous mapping.

Further, as shown in FIG. 16, the transmitter 1 further includes an encoding unit 15, where the encoding unit 15 is configured to: before the modulation unit 12 modulates the X second optical channel physical link signals by using the X preset optical modules in the one-to-one correspondence manner, perform forward error correction FEC encoding processing on the X second optical channel physical link signals generated by the overhead addition unit 11.

Further, each of the X first optical channel physical link signals of m$_i$ times the benchmark rate has a different m$_i$; or any j of the X first optical channel physical link signals of m$_i$ times the benchmark rate have a same m$_i$, where 2≥j≥X.

Further, if the optical channel unit signal of n times the benchmark rate is an optical channel data unit ODUKn signal of n times the benchmark rate, the first optical channel physical link signal of m$_i$ times the benchmark rate is a first optical channel transport unit OTUKm$_i$ signal of m$_i$ times the benchmark rate.

This embodiment of the present disclosure provides a transmitter, which mainly includes a mapping unit, an overhead addition unit, a modulation unit, and a sending unit. After mapping a to-be-transmitted optical channel unit signal of n times a benchmark rate to X first optical channel physical link signals of m$_i$ times the benchmark rate, the transmitter adds a link sequence indicator overhead to each first optical channel physical link signal of m$_i$ times the benchmark rate of the X first optical channel physical link signals of m$_i$ times the benchmark rate, to generate X second optical channel physical link signals of m$_i$ times the benchmark rate, where n≥2, X≥2, m$_i$≥1, m$_1$+m$_2$+ ... +m$_i$+ ... m$_X$=n, and the link sequence indicator overhead of each first optical channel physical link signal is used to indicate an order of the first optical channel physical link signal, and then the transmitter modulates and sends the X second optical channel physical link signals of m$_i$ times the benchmark rate by using X preset optical modules in a one-to-one correspondence manner.

By means of this solution, an optical channel unit signal of n times a benchmark rate is no longer mapped to a first optical channel physical link signal of a same rate as the optical channel unit signal, but is mapped to X first optical channel physical link signals of m$_i$ times the benchmark rate. The rate of the first optical channel physical link signal is m$_i$ times the benchmark rate, and m$_1$+m$_2$+ ... +m$_i$+ ... +m$_X$=n. Therefore, the rate of the first optical channel physical link signal is less than the rate of the optical channel unit signal. That is, in the present disclosure, the optical channel unit signal is decomposed into X low-rate signals. Subsequently, the X low-rate signals are modulated and sent by using X preset optical modules. By means of the present disclosure, X existing low-rate optical modules can be used to modulate X signals, and an optical module that matches a rate corresponding to an optical channel unit signal is no longer used for modulation, thereby reducing network costs when optical channel units of different rates need to use optical modules of different rates to perform modulation.

Further, if the optical channel unit signal is an optical channel data unit ODUKn signal, and the benchmark rate is 100 G, the ODUKn signal in this embodiment of the present disclosure is an optical channel data unit ODUCn signal of a rate of n*100 G. In such an application scenario, the present disclosure can reduce network costs for sending ODUCns of different rates.

Embodiment 6

Figure 17:
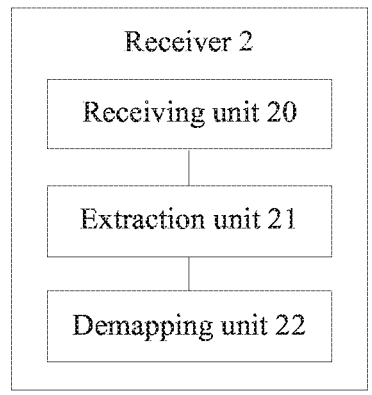
FIG. 17 is a first schematic structural diagram of a receiver according to an embodiment of the present disclosure.

This embodiment of the present disclosure provides a receiver 2. As shown in FIG. 17, the receiver 2 includes: a receiving unit 20, configured to receive X second optical channel physical link signals by using X optical modules, where a rate of the second optical channel physical link signal is mi times a benchmark rate, mi≥1, and X≥2. The receiver 2 further includes an extraction unit 21, configured to separately extract a link sequence indicator overhead of each of the X second optical channel physical link signals received by the receiving unit 20, to obtain X first optical channel physical link signals, where the link sequence indicator overhead of each second optical channel physical link signal is used to indicate an order of a first optical channel physical link signal that corresponds to the second optical channel physical link signal, and a rate of the first optical channel physical link signal is mi times the benchmark rate. The receiver 2 further includes a demapping unit 22, configured to demap the X first optical channel physical link signals obtained by the extraction unit 21, to obtain an optical channel unit signal of n times the benchmark rate, where n≥2, and $$\sum_{i=1}^{X} m_i = n.$$

Further, the demapping unit 22 is specifically configured to demap the X first optical channel physical link signals in a preset demapping manner, to obtain X groups of optical channel unit signals, where the preset demapping manner is bit synchronous demapping or asynchronous demapping, and a rate of each group of optical channel unit signals is mi times the benchmark rate.

Figure 18:
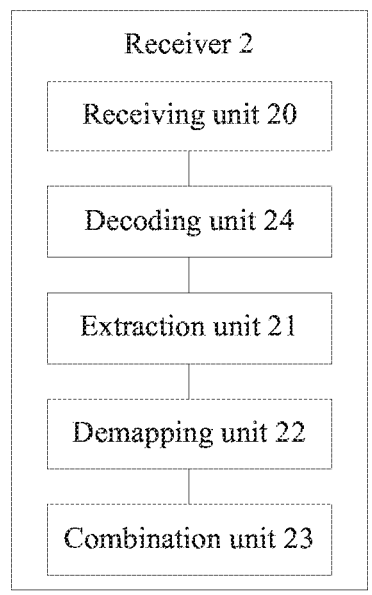
FIG. 18 is a second schematic structural diagram of a receiver according to an embodiment of the present disclosure.

Further, as shown in FIG. 18, the receiver 2 further includes a combination unit 23, where the combination unit 23 is specifically configured to combine the X groups of optical channel unit subframe signals obtained by the demapping unit 22, to generate the optical channel unit signal of n times the benchmark rate.

Further, as shown in FIG. 18, the receiver 2 further includes a decoding unit 24, where the decoding unit 24 is configured to: before the extraction unit 21 separately extracts the link sequence indicator overhead of each of the X second optical channel physical link signals, to obtain the X first optical channel physical link signals, perform forward error correction FEC decoding on the X second optical channel physical link signals received by the receiving unit.

Further, each of the X second optical channel physical link signals of mi times the benchmark rate has a different mi; or any j of the X second optical channel physical link signals of mi times the benchmark rate have a same mi, where 2≥j≥X.

Further, if the second optical channel physical link signal of mi times the benchmark rate is a second optical channel transport unit OTUKmi signal of mi times the benchmark rate, the optical channel unit signal of n times the benchmark rate is an optical channel data unit ODUKn signal of n times the benchmark rate.

This embodiment of the present disclosure provides a receiver, which mainly includes a receiving unit, an extraction unit, and a demapping unit. After receiving X second optical channel physical link signals of mi times a benchmark rate by using X optical modules, the receiver separately extracts a link sequence indicator overhead of each of the X second optical channel physical link signals, to obtain X first optical channel physical link signals, where mi≥1, X≥2, and the link sequence indicator overhead of each second optical channel physical link signal is used to indicate an order of a first optical channel physical link signal that corresponds to the second optical channel physical link signal, and then the receiver demaps the X first optical channel physical link signals, to obtain an optical channel unit signal of n times the benchmark rate, where n≥2, and m1+m2+ . . . +mi+ . . . +mX=n.

By means of this solution, after performing related processing on the received X second optical channel physical link signals of mi times the benchmark rate, the receiver obtains X first optical channel physical link signals of mi times the benchmark rate, and the receiver obtains the optical channel unit signal of n times the benchmark rate by demapping the X first optical channel physical link signals. The rate of the first optical channel physical link signal is mi times the benchmark rate, and m1+m2+ . . . +mi+ . . . +mX=n. Therefore, the rate of the first optical channel physical link signal is less than the rate of the optical channel unit signal. That is, the rate of the second optical channel physical link signal is less than the rate of the optical channel unit signal. In this way, the receiver demodulates M optical carrier signals by using X existing low-rate optical modules, and no longer uses an optical module that matches a rate corresponding to the optical channel unit signal to perform demodulation, thereby reducing network costs when optical channel units of different rates need to use optical modules of different rates to perform demodulation.

Further, if the optical channel unit signal is an optical channel data unit ODUKn signal, and the benchmark rate is 100 G, the ODUKn signal in this embodiment of the present disclosure is an optical channel data unit ODUCn signal of a rate of n*100 G. In such an application scenario, the present disclosure can reduce network costs for sending ODUCns of different rates.

Embodiment 7

Figure 19:
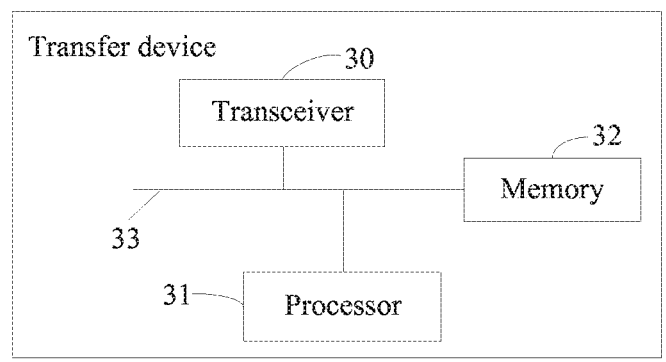
FIG. 19 is a second schematic structural diagram of a transfer device according to an embodiment of the present disclosure.

This embodiment of the present disclosure provides a transfer device. As shown in FIG. 19, the transfer device includes one or more transceivers 30, a processor 31, a memory 32, and a system bus 33, where the one or more transceivers 30, the processor 31, and the memory 32 are connected to and communicate with each other by using the system bus 33.

The processor 31 may be a single-core or multi-core central processing unit, or an application-specific integrated circuit, or one or more integrated circuits configured to implement this embodiment of the present disclosure.

The memory 32 may be a high-speed Random Access Memory (RAM), and may be a non-volatile memory, for example, at least one magnetic disk storage.

Specifically, the transfer device in this embodiment of the present disclosure may be a sending device, or may be a receiving device. The transfer device may map a to-be-transmitted optical channel unit signal of n times a benchmark rate to X first optical channel physical link signals, perform related processing on the X first optical channel physical link signals, and send the processed X first optical channel physical link signals. Alternatively, the transfer device may demap received X second optical channel physical link signals to obtain an optical channel unit signal of n times a benchmark rate.

Specifically, the processor 31 is configured to map a to-be-transmitted optical channel unit signal of n times a benchmark rate to X first optical channel physical link signals, where a rate of the first optical channel physical link signal is $m_i$ times the benchmark rate, $n \geq 2$, $X \geq 2$, $m_i \geq 1$, and $$\sum_{i=1}^{X} m_i = n;$$

and configured to add a link sequence indicator overhead to each of the X first optical channel physical link signals, to generate X second optical channel physical link signals, where the link sequence indicator overhead of each first optical channel physical link signal is used to indicate an order of the first optical channel physical link signal, and a rate of the second optical channel physical link signal is $m_i$ times the benchmark rate; and configured to modulate the X second optical channel physical link signals by using X preset optical modules in a one-to-one correspondence manner.

Specifically, the one or more transceivers 30 is configured to send the X second optical channel physical link signals modulated by the processor 31.

Further, the processor 31 is specifically configured to divide the to-be-transmitted optical channel unit signal of n times the benchmark rate into X preset groups; and specifically configured to map the X groups of optical channel unit signals to the X first optical channel physical link signals in a one-to-one correspondence manner and in a preset mapping manner, where the preset mapping manner is bit synchronous mapping or asynchronous mapping.

Further, the processor 31 is further configured to: before modulating the X second optical channel physical link signals by using the X preset optical modules in the one-to-one correspondence manner, perform forward error correction FEC encoding processing on the X second optical channel physical link signals.

Further, each of the X first optical channel physical link signals of $m_i$ times the benchmark rate has a different $m_i$; or any j of the X first optical channel physical link signals of $m_i$ times the benchmark rate have a same $m_i$, where $2 \leq j \leq X$.

Further, if the optical channel unit signal of n times the benchmark rate is an optical channel data unit ODUKn signal of n times the benchmark rate, the first optical channel physical link signal of $m_i$ times the benchmark rate is a first optical channel transport unit OTUKm$_i$ signal of $m_i$ times the benchmark rate.

Further, if the optical channel unit signal of n times the benchmark rate is an optical channel payload unit OPUKn signal of n times the benchmark rate, the first optical channel physical link signal of $m_i$ times the benchmark rate is a first optical channel transport unit OTUKm$_i$ signal of $m_i$ times the benchmark rate.

Further, if the optical channel unit signal of n times the benchmark rate is an optical channel transport unit OTUKn signal of n times the benchmark rate, the first optical channel physical link signal of $m_i$ times the benchmark rate is an FEC frame whose payload area is an OTUKm$_i$ of $m_i$ times the benchmark rate.

Further, if the benchmark rate is 100 G, the ODUKn signal is an optical channel data unit ODUCn signal of a rate of n*100 G, the OTUKm$_i$ signal is an optical channel transport unit OTUCm$_i$ signal of a rate of $m_i$*100 G, and the OTUKn signal is an OTUCn signal of a rate of n*100 G.

Further, the one or more transceivers 30 is further configured to receive X second optical channel physical link signals by using X optical modules, where a rate of the second optical channel physical link signal is $m_i$ times a benchmark rate, $m_i \geq 1$, and $X \geq 2$.

Further, the processor 31 is further configured to separately extract a link sequence indicator overhead of each of the X second optical channel physical link signals, to obtain X first optical channel physical link signals, where the link sequence indicator overhead of each second optical channel physical link signal is used to indicate an order of a first optical channel physical link signal that corresponds to the second optical channel physical link signal, and a rate of the first optical channel physical link signal is $m_i$ times the benchmark rate; and configured to demap the X first optical channel physical link signals, to obtain an optical channel unit signal of n times the benchmark rate, where $n \geq 2$, and $$\sum_{i=1}^{X} m_i = n.$$

Further, the processor 31 is specifically configured to demap the X first optical channel physical link signals in a preset demapping manner, to obtain X groups of optical channel unit signals, where the preset demapping manner is bit synchronous demapping or asynchronous demapping, and a rate of each group of optical channel unit signals is $m_i$ times the benchmark rate; and specifically configured to combine the X groups of optical channel unit subframe signals, to generate the optical channel unit signal of n times the benchmark rate.

Further, the processor 31 is further configured to: before separately extracting the link sequence indicator overhead of each of the X second optical channel physical link signals, to obtain the X first optical channel physical link signals, perform forward error correction FEC decoding on the X second optical channel physical link signals received by the one or more transceivers 30.

This embodiment of the present disclosure provides a transfer device. After mapping a to-be-transmitted optical channel unit signal of n times a benchmark rate to X first optical channel physical link signals of $m_i$ times the benchmark rate, the transfer device adds a link sequence indicator overhead to each first optical channel physical link signal of $m_i$ times the benchmark rate of the X first optical channel physical link signals of $m_i$ times the benchmark rate, to generate X second optical channel physical link signals of $m_i$ times the benchmark rate, where $n \geq 2$, $X \geq 2$, $m_i \geq 1$, $m_1 + m_2 + \ldots + m_i + \ldots m_X = n$, and the link sequence indicator overhead of each first optical channel physical link signal is used to indicate an order of the first optical channel physical link signal, and then the transfer device modulates and sends the X second optical channel physical link signals of $m_i$ times the benchmark rate by using X preset optical modules in a one-to-one correspondence manner.

By means of this solution, an optical channel unit signal of n times a benchmark rate is no longer mapped to a first optical channel physical link signal of a same rate as the optical channel unit signal, but is mapped to X first optical channel physical link signals of $m_i$ times the benchmark rate. The rate of the first optical channel physical link signal is $m_i$ times the benchmark rate, and $m_1+m_2+\ldots+m_i+\ldots m_X=n$. Therefore, the rate of the first optical channel physical link signal is less than the rate of the optical channel unit signal. That is, in the present disclosure, the optical channel unit signal is decomposed into X low-rate signals. Subsequently, the X low-rate signals are modulated and sent by using X preset optical modules. By means of the present disclosure, X existing low-rate optical modules can be used to modulate X signals, and an optical module that matches a rate corresponding to an optical channel unit signal is no longer used for modulation, thereby reducing network costs when optical channel units of different rates need to use optical modules of different rates to perform modulation.

Further, if the optical channel unit signal is an optical channel data unit ODUKn signal, and the benchmark rate is 100 G, the ODUKn signal in this embodiment of the present disclosure is an optical channel data unit ODUCn signal of a rate of n*100 G. In such an application scenario, the present disclosure can reduce network costs for sending ODUCns of different rates.

Embodiment 8

Figure 20:
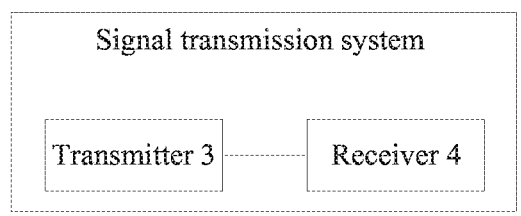
FIG. 20 is a schematic structural diagram of a signal transmission system according to an embodiment of the present disclosure.

This embodiment of the present disclosure provides a signal transmission system. As shown in FIG. 20, the system includes the transmitter 3 that has any one of the foregoing features and the receiver 4 that has any one of the foregoing features.

This embodiment of the present disclosure provides a signal transmission system. After mapping a to-be-transmitted optical channel unit signal of n times a benchmark rate to X first optical channel physical link signals of $m_i$ times the benchmark rate, a transmitter adds a link sequence indicator overhead to each first optical channel physical link signal of $m_i$ times the benchmark rate of the X first optical channel physical link signals of $m_i$ times the benchmark rate, to generate X second optical channel physical link signals of $m_i$ times the benchmark rate, where n≥2, X≥2, $m_i$≥1, $m_1+m_2+\ldots+m_i+\ldots m_X=n$, and the link sequence indicator overhead of each first optical channel physical link signal is used to indicate an order of the first optical channel physical link signal, and then the transmitter modulates and sends the X second optical channel physical link signals of $m_i$ times the benchmark rate by using X preset optical modules in a one-to-one correspondence manner.

By means of this solution, an optical channel unit signal of n times a benchmark rate is no longer mapped to a first optical channel physical link signal of a same rate as the optical channel unit signal, but is mapped to X first optical channel physical link signals of $m_i$ times the benchmark rate. The rate of the first optical channel physical link signal is $m_i$ times the benchmark rate, and $m_1+m_2+\ldots+m_i+\ldots m_X=n$. Therefore, the rate of the first optical channel physical link signal is less than the rate of the optical channel unit signal. That is, in the present disclosure, the optical channel unit signal is decomposed into X low-rate signals. Subsequently, the X low-rate signals are modulated and sent by using X preset optical modules. By means of the present disclosure, X existing low-rate optical modules can be used to modulate X signals, and an optical module that matches a rate corresponding to an optical channel unit signal is no longer used for modulation, thereby reducing network costs when optical channel units of different rates need to use optical modules of different rates to perform modulation.

Further, if the optical channel unit signal is an optical channel data unit ODUKn signal, and the benchmark rate is 100 G, the ODUKn signal in this embodiment of the present disclosure is an optical channel data unit ODUCn signal of a rate of n*100 G. In such an application scenario, the present disclosure can reduce network costs for sending ODUCns of different rates.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate. Parts displayed as units may or may not be physical units, and may be located in one position or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method comprising:
   mapping, by a sending device, a to-be-transmitted optical channel unit signal having n times a benchmark rate to X first optical channel physical link signals, wherein a rate of each of the X first optical channel physical link signals is $m_i$ times the benchmark rate, $n \geq 2$, $X \geq 2$, $m_i \geq 1$, and $$\sum_{i=1}^{X} m_1 = n,$$

the to-be-transmitted optical channel unit signal is an optical transport unit (OTUKn) signal and each of the X first optical channel physical link signals is a forward error correction (FEC) frame, wherein mapping the to-be-transmitted optical channel unit signal of n times the benchmark rate to the X first optical channel physical link signals comprises:
      dividing the to-be-transmitted optical channel unit signal of n times the benchmark rate into X preset groups; and
      mapping the X preset groups of optical channel unit signals to the X first optical channel physical link signals in a one-to-one manner and according to a preset mapping rule, wherein the preset mapping rule is bit synchronous mapping or asynchronous mapping;
      generating, by the sending device, X second optical channel physical link signals by adding a link sequence indicator overhead to each of the X first optical channel physical link signals, wherein the link sequence indicator overhead of each of the X first optical channel physical link signals indicates:
         an order of a respective one of the X first optical channel physical link signals; and
      a rate of a respective one of the X second optical channel physical link signals is $m_i$ times the benchmark rate; and
      sending, by one or more transceivers of the sending device, the X second optical channel physical link signals.

2. The method according to claim 1, wherein before sending the X second optical channel physical link signals, the method further comprises:
   performing FEC encoding on the X second optical channel physical link signals.

3. The method according to claim 1, wherein each of the X first optical channel physical link signals has a different $m_i$.

4. The method according to claim 1, wherein j first optical channel physical link signals of the X first optical channel physical link signals have a same $m_i$, and wherein $2 \leq j \leq X$.

5. The method according to claim 1 further comprises:
   adding, by the sending device, a link group indicator to each of the X first optical channel physical link signals, the link group indicator indicates whether the X first optical channel physical link signals have a same source.

6. A method, comprising:
   receiving, by a receiving device, X second optical channel physical link signals using one or more transceivers of the receiving device, wherein a rate of each of the X second optical channel physical link signals is $m_i$ times a benchmark rate, $m_i \geq 1$, and $X \geq 2$, and each of the X second optical channel physical link signals is a forward error correction (FEC) frame;
   extracting, by the receiving device, a link sequence indicator overhead from each of the X second optical channel physical link signals to obtain X first optical channel physical link signals, wherein the link sequence indicator overhead of each of the X second optical channel physical link signals indicates:
      an order of a first optical channel physical link signal of the X first optical channel physical link signals that corresponds to a respective one of the X second optical channel physical link signals; and
      a rate of the first optical channel physical link signal is $m_i$ times the benchmark rate; and
   demapping, by the receiver, the X first optical channel physical link signals to obtain an optical channel unit signal having n times the benchmark rate, wherein $n \geq 2$, and $$\sum_{i=1}^{X} m_1 = n,$$

and the optical channel unit signal is an optical transport unit (OTUKn) signal, wherein demapping step comprises:
      demapping the X first optical channel physical link signals according to a preset demapping rule to obtain X groups of optical channel unit signals, wherein the preset demapping rule is bit synchronous demapping or asynchronous demapping, and a rate of each group of X groups of optical channel unit signals is $m_i$ times the benchmark rate; and
      combining the X groups of optical channel unit signals to generate the optical channel unit signal having n times the benchmark rate.

7. The method according to claim 6, wherein before extracting the link sequence indicator overhead of each of the X second optical channel physical link signals, the method further comprises:
   performing FEC decoding on the X second optical channel physical link signals.

8. The method according to claim 6, wherein each of the X second optical channel physical link signals has a different $m_i$.

9. The method according to claim 6, wherein j second optical channel physical link signals of the X second optical channel physical link signals have a same $m_i$, wherein $2 \leq j \leq X$.

10. The method according to claim 6 further comprises:
    extracting, by the receiving device, a link group indicator to each of the X second optical channel physical link signals, the link group indicator indicates whether the X first FEC optical channel physical link signals have a same source.

11. A device, comprising:
    a processor;
    a non-transitory computer readable medium connected to the processor and having stored thereon instructions that, when executed, cause the processor to:
       map a to-be-transmitted optical channel unit signal having n times a benchmark rate to X first optical channel physical link signals, wherein a rate of each of the X first optical channel physical link signals is $m_i$ times the benchmark rate, n≥2, X≥2, $m_i$≥1, and $$\sum_{i=1}^{X} m_1 = n,$$

the to-be-transmitted optical channel unit signal is an optical transport unit (OTUKn) signal and each of the X first optical channel physical link signals is a forward error correction (FEC) frame, wherein the instructions to map the to-be-transmitted optical channel unit signal of n times the benchmark rate comprises further instructions to:
 divide the to-be-transmitted optical channel unit signal of n times the benchmark rate into X preset groups; and
 map the X preset groups of optical channel unit signals to the X first optical channel physical link signals in a one-to-one manner and according to a preset mapping rule, wherein the preset mapping rule is bit synchronous mapping or asynchronous mapping;
 generate X second optical channel physical link signals by adding a link sequence indicator overhead to each of the X first optical channel physical link signals, wherein the link sequence indicator overhead of each of the X first optical channel physical link signal indicates: an order of a respective one of the X first optical channel physical link signals; and a rate of the X second optical channel physical link signal is mi times the benchmark rate; and
 one or more transceivers coupled with the processor, the one or more transceivers configured to send the X second optical channel physical link signals.

12. The device according to claim 11, wherein instructions comprise further instructions to, perform FEC encoding on the X second optical channel physical link signals.

13. The device according to claim 11, wherein each of the X first optical channel physical link signals having $m_i$ times the benchmark rate has a different $m_i$.

14. The device according to claim 11, wherein j first optical channel physical link signals of the X first optical channel physical link signals of $m_i$ times the benchmark rate have a same $m_j$, wherein 2≤j≤X.

15. The device according to claim 11, wherein instructions comprise further instructions to:
 add a link group indicator to each of the X first optical channel physical link signals, the link group indicator indicates whether the X first optical channel physical link signals have a same source.

\* \* \* \* \*